United States Patent
Wojczak et al.

(10) Patent No.: US 12,419,403 B2
(45) Date of Patent: Sep. 23, 2025

(54) HAIR TOOLS WITH ADDITIVES

(71) Applicant: CONAIR CORPORATION, Stamford, CT (US)

(72) Inventors: Sophia Wojczak, Harrison, NY (US); Lawrence Cruz, Weston, CT (US); Daniel Bishop, Monroe, CT (US); Jennifer Burke, Stamford, CT (US)

(73) Assignee: Conair LLC, Stamford, CT (US)

( * ) Notice: Subject to any disclaimer, the term of this patent is extended or adjusted under 35 U.S.C. 154(b) by 471 days.

(21) Appl. No.: 16/689,610

(22) Filed: Nov. 20, 2019

(65) Prior Publication Data
US 2021/0145145 A1    May 20, 2021

(51) Int. Cl.
| | |
|---|---|
| *A45D 24/00* | (2006.01) |
| *A45D 24/22* | (2006.01) |
| *A46B 11/00* | (2006.01) |
| *A46D 1/00* | (2006.01) |
| *B33Y 80/00* | (2015.01) |
| *A45D 24/02* | (2006.01) |

(52) U.S. Cl.
CPC .......... *A45D 24/22* (2013.01); *A46B 11/0006* (2013.01); *A46D 1/0246* (2013.01); *B33Y 80/00* (2014.12); *A45D 24/02* (2013.01)

(58) Field of Classification Search
CPC ........ A45D 24/14; A45D 24/10; A45D 24/22; A45D 24/24; A45D 24/26; A45D 24/02; A45D 24/28; A45D 2019/0033; A45D 19/0041; A45D 19/0083; A45D 19/026; A45D 19/028; A46B 11/0006
See application file for complete search history.

(56) References Cited

U.S. PATENT DOCUMENTS

| | | | |
|---|---|---|---|
| 727,312 A | 5/1903 | Douglas | |
| 1,794,130 A | 2/1931 | Whalen | |
| 2,569,276 A | 9/1951 | Baptist | |
| 4,013,086 A | 3/1977 | Chmela | |
| 4,090,522 A | 5/1978 | Donley et al. | |
| 4,585,018 A | 4/1986 | O'Connor | |
| 4,834,076 A * | 5/1989 | Millet | A61K 8/02 |
| | | | 15/104.93 |
| 4,867,183 A * | 9/1989 | Busch | A45D 19/02 |
| | | | 132/110 |
| 5,261,426 A | 11/1993 | Kellett et al. | |
| 5,291,905 A * | 3/1994 | Busch | A61Q 5/12 |
| | | | 424/70.28 |
| 5,483,719 A * | 1/1996 | Ikemoto | A46B 11/001 |
| | | | 401/24 |
| 6,022,163 A * | 2/2000 | Asfur | A45D 24/22 |
| | | | 401/268 |
| 6,063,369 A * | 5/2000 | Pierce | A61Q 5/02 |
| | | | 424/70.28 |

(Continued)

FOREIGN PATENT DOCUMENTS

| | | |
|---|---|---|
| EP | 0168741 B1 | 1/1986 |
| WO | 2019074614 A2 | 4/2019 |

*Primary Examiner* — Rachel R Steitz
(74) *Attorney, Agent, or Firm* — Grogan, Tuccillo & Vanderleeden, LLP

(57) ABSTRACT

A hair tool includes a handle portion and a plurality of bristles operatively connected to the handle, the bristles containing at least one therapeutic agent additive. The at least one therapeutic agent additive includes CBD or hemp seed oil.

11 Claims, 33 Drawing Sheets

(56) References Cited

U.S. PATENT DOCUMENTS

| | | | |
|---|---|---|---|
| 6,530,378 B1* | 3/2003 | Piatetsky | A46B 11/0062 |
| | | | 132/115 |
| 7,526,829 B2* | 5/2009 | Chang | A46B 17/06 |
| | | | 15/186 |
| 7,807,731 B1 | 10/2010 | Bilski | |
| 7,832,413 B2 | 11/2010 | Walters et al. | |
| 7,845,360 B2 | 12/2010 | Walters et al. | |
| 8,347,894 B1* | 1/2013 | Stewart | A45D 24/28 |
| | | | 132/114 |
| 9,247,805 B1 | 2/2016 | Malm | |
| 2008/0099031 A1* | 5/2008 | Walters | A46B 7/04 |
| | | | 132/120 |
| 2015/0272313 A1 | 10/2015 | Alsalameh | |
| 2019/0335889 A1* | 11/2019 | Rosen | A46B 11/0065 |

* cited by examiner

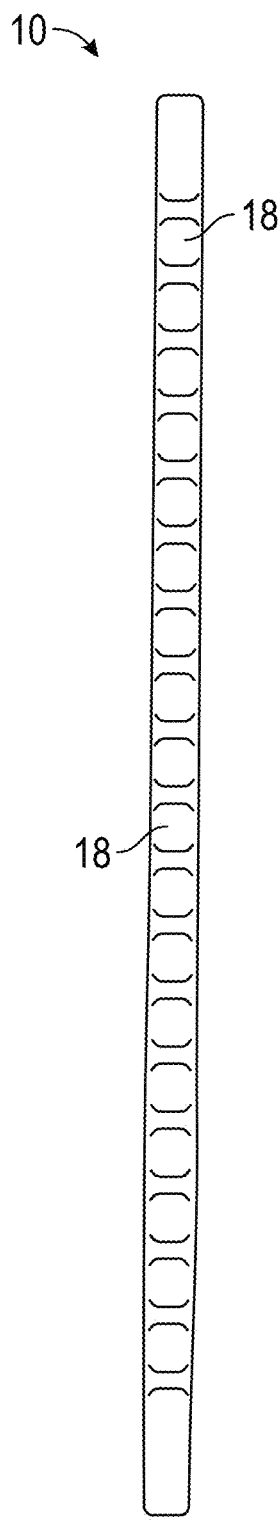
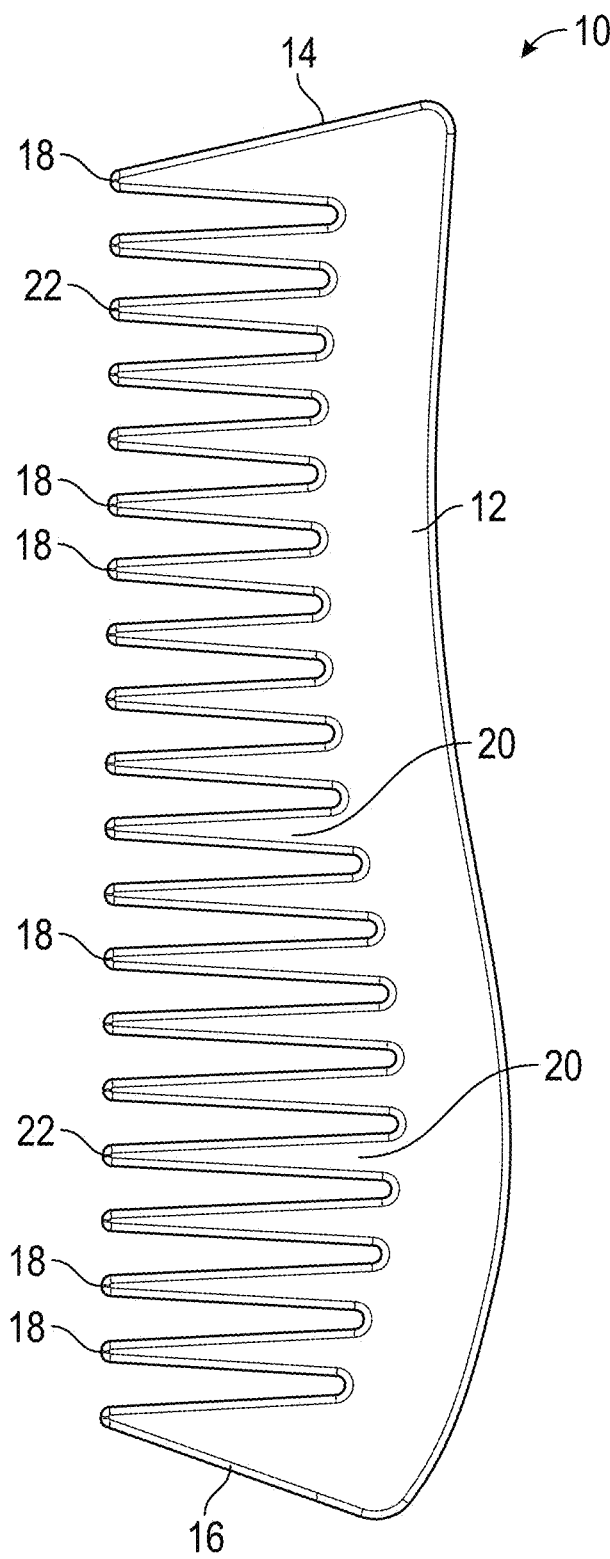
FIG. 1B
FIG. 1A

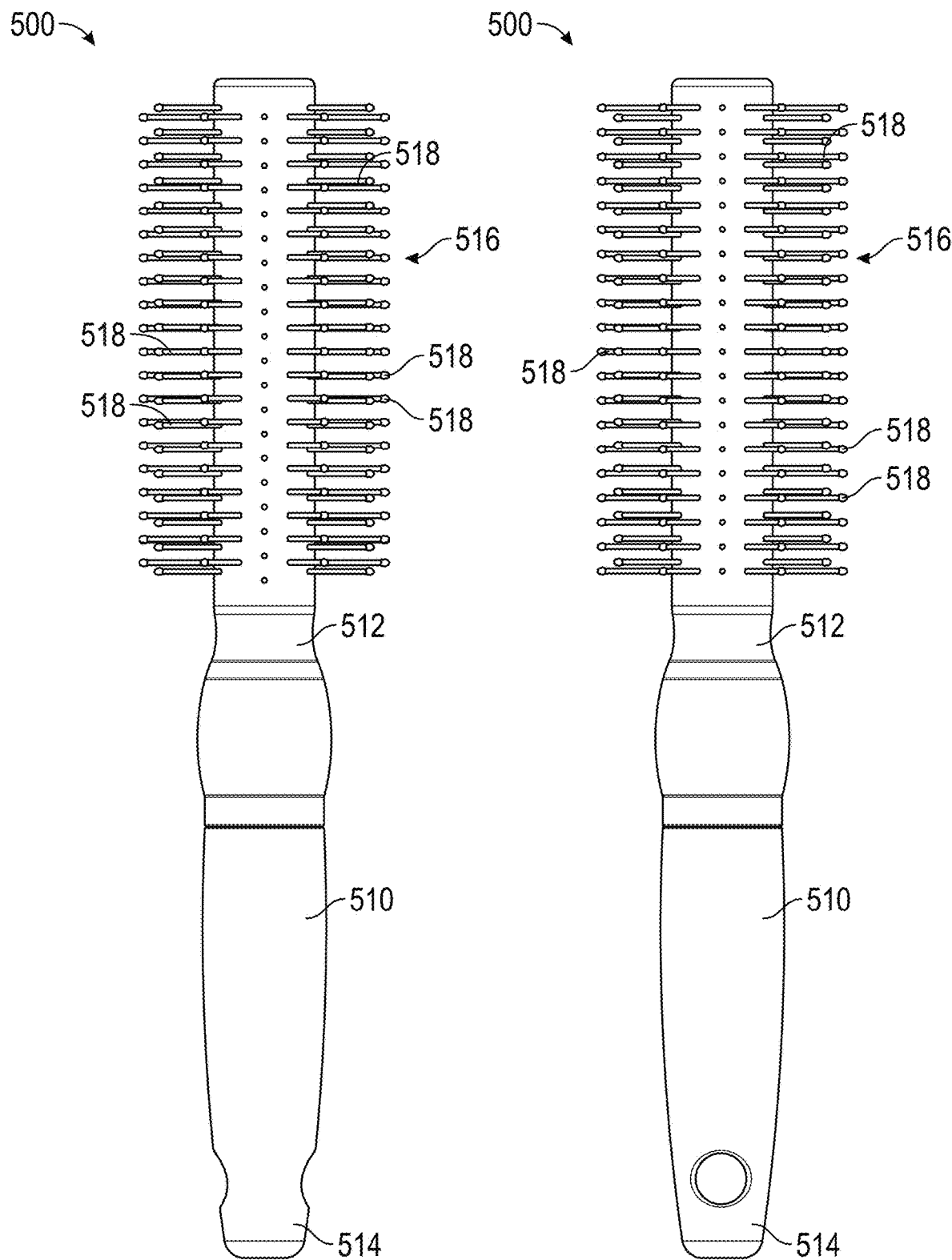

HAIR TOOLS WITH ADDITIVES

FIELD OF THE INVENTION

The present invention relates generally to hair tools and, more particularly, to hair tools such as grooming brushes and combs configured to deliver therapeutic additives or agents to the hair and/or scalp of a user.

BACKGROUND OF THE INVENTION

It is generally known in the field of injection molding and, particularly, in the field of injection molding plastic or polymer articles, that additives can be used for purposes such as, for example, improving mold release (i.e., the tendency of a molded product to stick, undesirably, to a mold from which it is formed) and for altering the properties or characteristics of the finished, molded articles (e.g., relative surface smoothness or roughness, scratch resistance, surface finish, pigment distribution, temperature resistance, strengths, durability and the like). Such additives are typically mixed with the mold material, and the material is injected into the mold and cooled to form a solidified part.

It is also known to use additives in liquid form, including oils or oil-based additives, to form plastic or polymer-based articles such as hair grooming combs and brushes that have the ability to slowly release such oils or oil-based additives during use in order to treat or condition hair, skin, animal fur or the like. Examples of such known articles and methods of manufacture and use are disclosed in, for example, U.S. Pat. Nos. 4,834,076 and 7,845,360, and United Kingdom Patent No. GB 2515734, each of which is incorporated by reference herein in its entirety. Alternatively, additives may be applied to hair grooming combs and brushes through the use of porous or micro-porous materials, absorbent pads or bristle cushions, and/or soft absorbent bristles, as disclosed in U.S. Pat. Nos. 5,483,719, 4,585,018 and 7,832,413, each of which is incorporated by reference herein in its entirety While the use of brushes and/or combs to deliver therapeutic agents to the hair or skin (e.g., scalp) is generally well known in the art, as a means to treat a variety of conditions, including hair color fade, dry hair, dandruff, and the like, there is a need for improved hair tools, such as grooming combs and brushes, that are capable of delivering additional therapeutic agents to the hair and/or skin of a user.

SUMMARY OF THE INVENTION

In view of the foregoing, it is an object of the present invention to provide a hair tool.

It is another object of the present invention to provide a hair tool and in, particular, a grooming comb or brush.

It is another object of the present invention to provide a grooming comb or brush that is configured to deliver a therapeutic agent to the hair and skin of a user.

It is another object of the present invention to provide a grooming comb or brush that is configured to deliver cannabidiol or hemp seed oil to the hair and/or skin of a user.

These and other objects are achieved by the present invention.

According to an embodiment of the present invention, a hair tool includes a handle portion and a plurality of bristles operatively connected to the handle, the bristles containing at least one therapeutic agent additive. The at least one therapeutic agent additive includes CBD or hemp seed oil.

According to another embodiment of the present invention, a method of manufacturing a hair tool includes mixing a therapeutic agent additive with a material, and forming the material with the therapeutic agent additive into a hair tool having a handle portion and a plurality of bristles operatively connected to the handle. The at least one therapeutic agent additive includes CBD or hemp seed oil.

According to yet another embodiment of the present invention, a method of manufacturing a hair tool includes forming a handle portion and a plurality of bristles operatively connected to the handle, and at least one of impregnating, infusing or saturating the plurality of bristles with at least one therapeutic agent additive. The at least one therapeutic agent additive is at least one of CBD or hemp seed oil.

BRIEF DESCRIPTION OF THE DRAWINGS

The present invention will be better understood from reading the following description of non-limiting embodiments, with reference to the attached drawings, wherein below:

FIG. 1A is a first side view of a hair tool according to a first embodiment of the present invention.
FIG. 1B is a second side view of the hair tool of FIG. 1A.
FIG. 2F is a first perspective view of the hair tool of FIG. 4A.
FIG. 5A is a first side view of a hair tool according to a fifth embodiment of the present invention.
FIG. 5B is a second side view of the hair tool of FIG. 5A.

FIG. 75 is a second side view of the hair tool of FIG. 7A.

DETAILED DESCRIPTION OF THE PREFERRED EMBODIMENTS

Figure 1C:
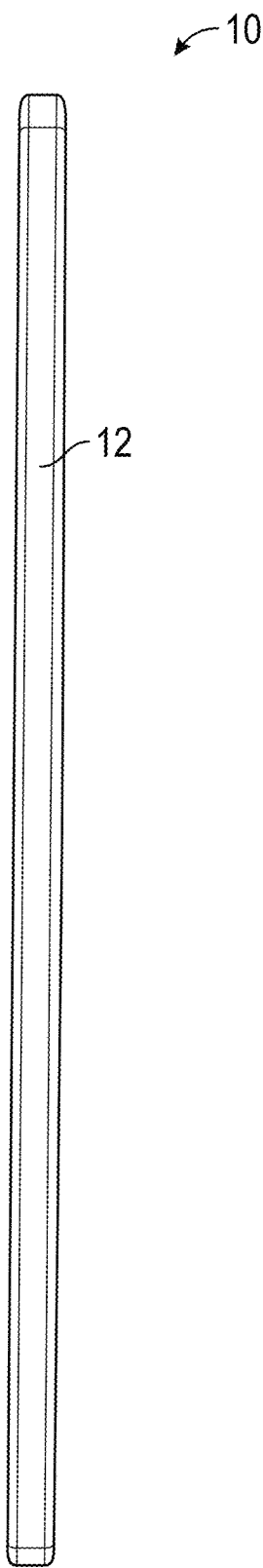
FIG. 1C is a third side view of the hair tool of FIG. 1A.
Figure 1D:
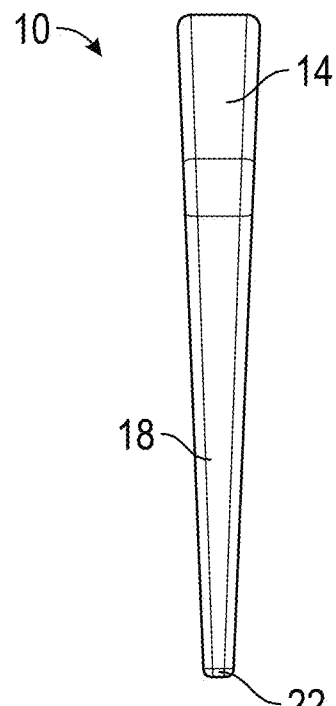
FIG. 1D is a front end view of the hair tool of FIG. 1A.
Figure 1E:
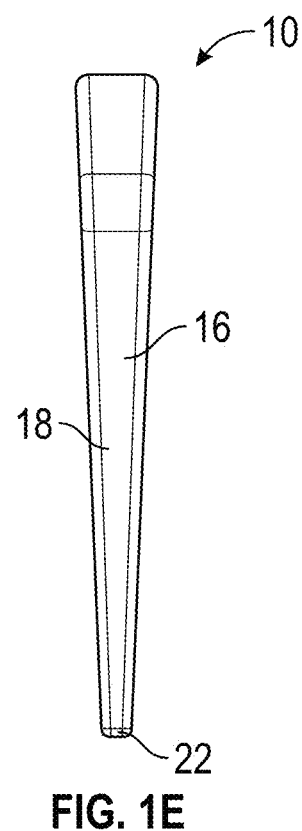
FIG. 1E is a rear end view of the hair tool of FIG. 1A.
Figure 1F:
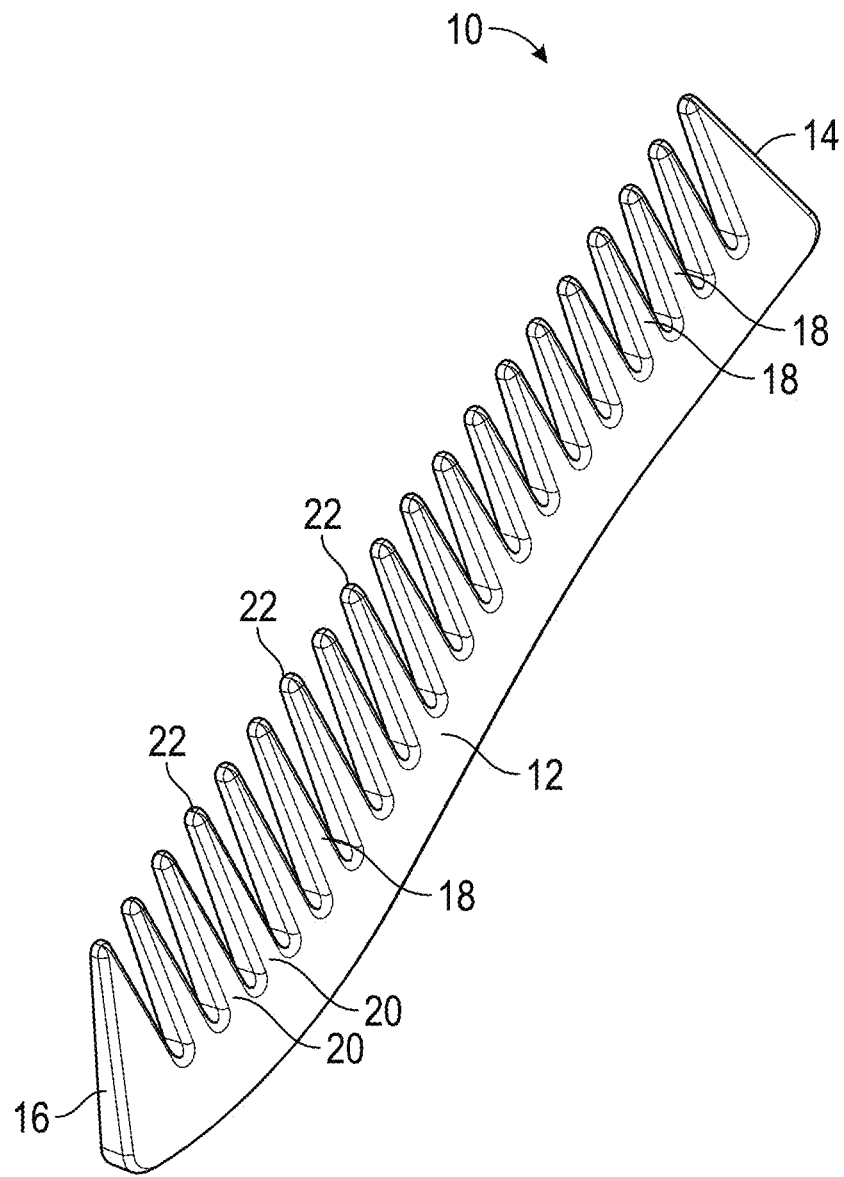
FIG. 1F is a first perspective view of the hair tool of FIG. 1A.
Figure 1G:
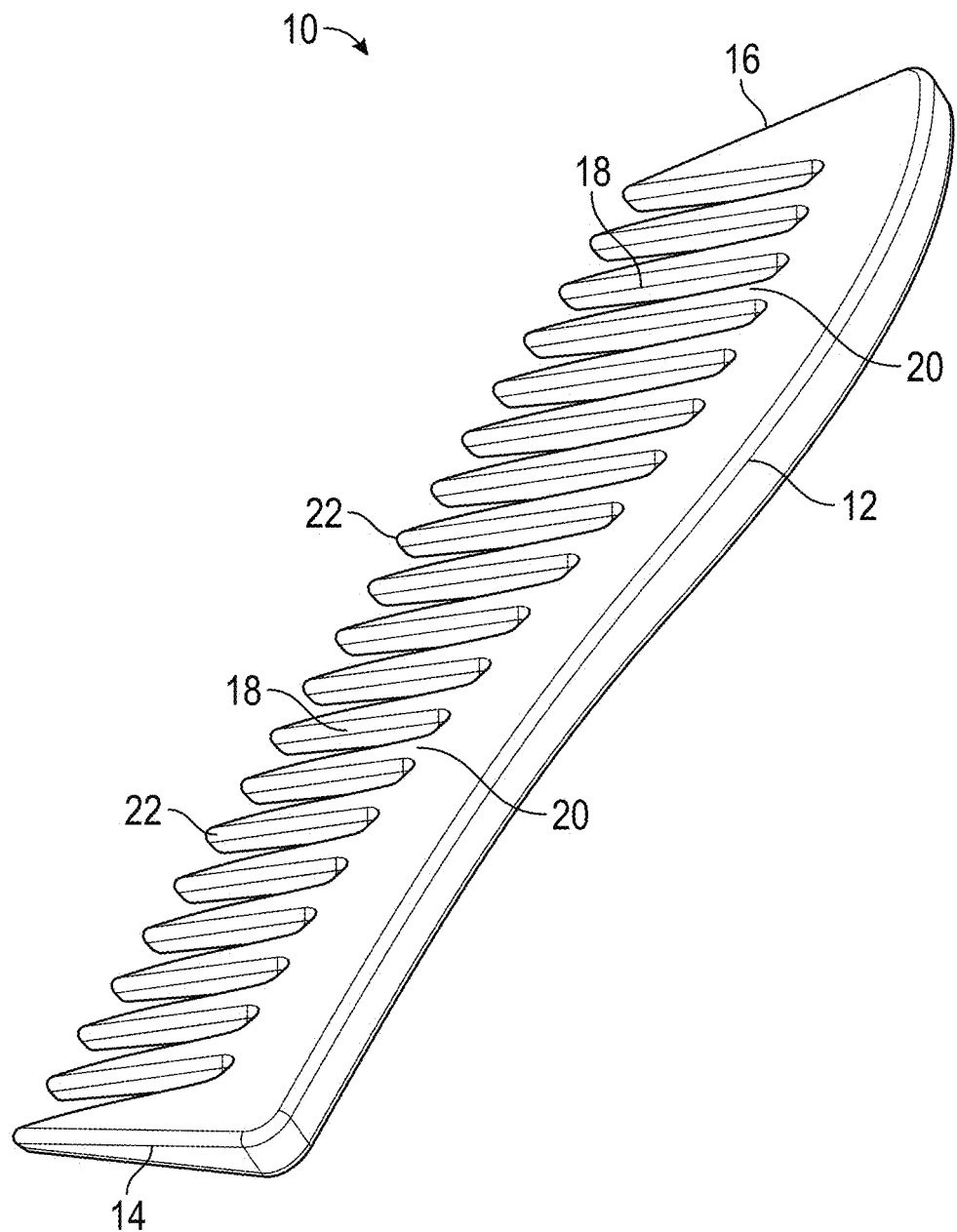
FIG. 1G is a second perspective view of the hair tool of FIG. 1A.
Figures 2A, 2B:
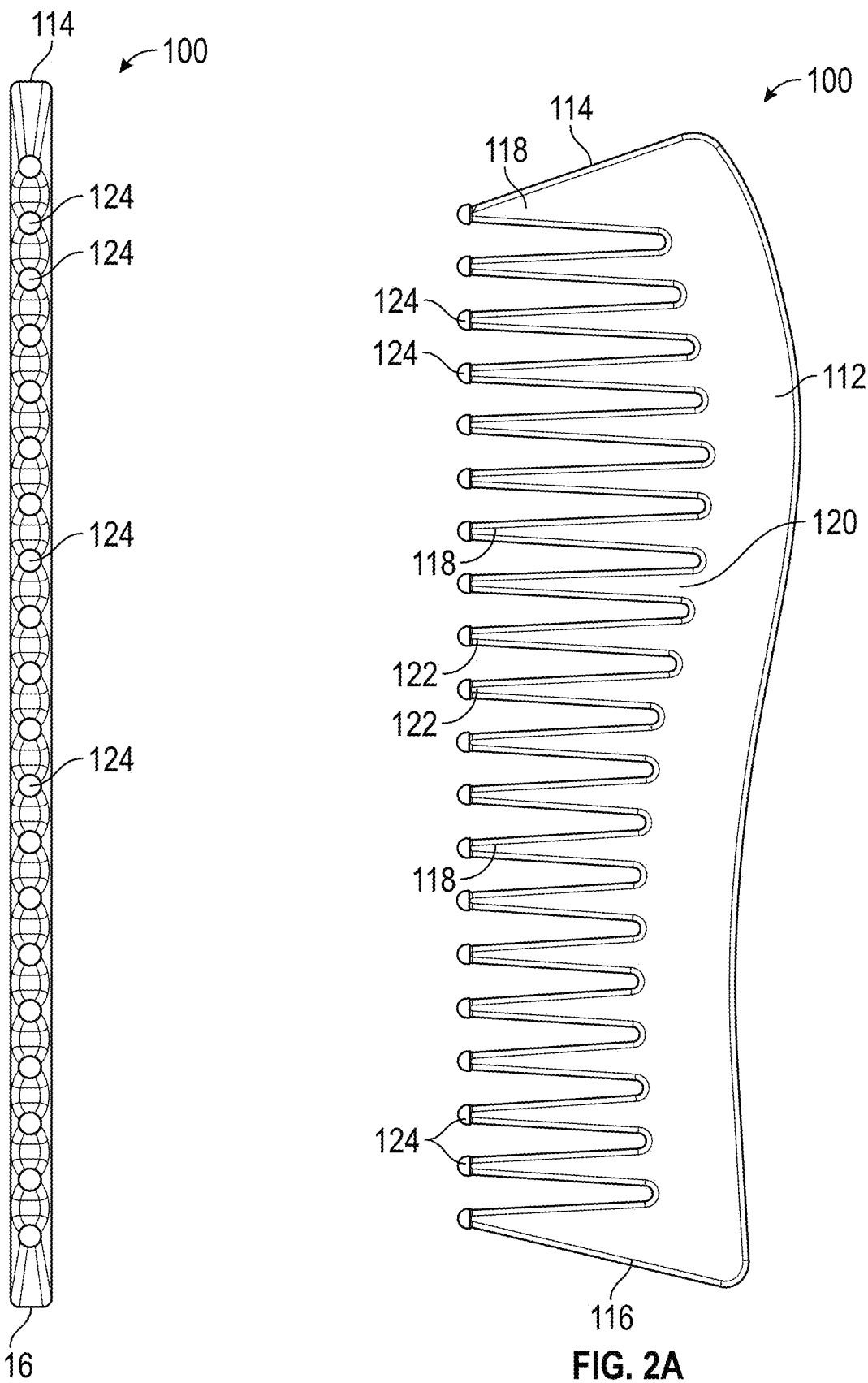
FIG. 2A is a first side view of a hair tool according to a second embodiment the present invention.
FIG. 2B is a second side view of the hair tool of FIG. 2A.
Figure 2C:
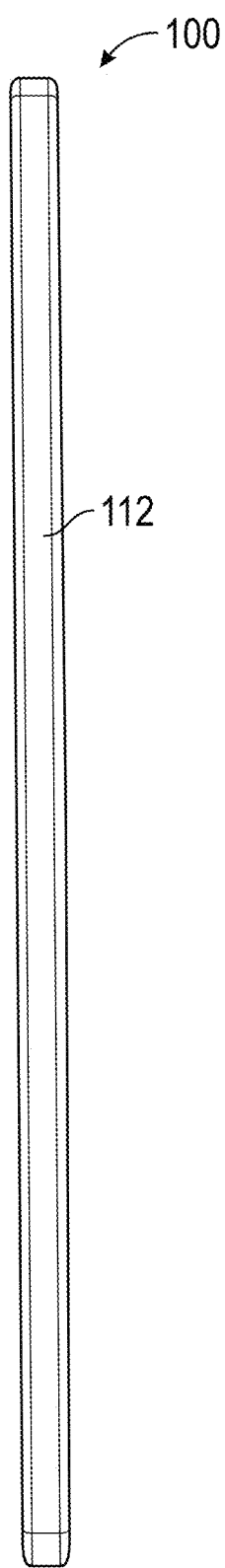
FIG. 2C is a third side view of the hair tool of FIG. 2A.
Figure 2D:
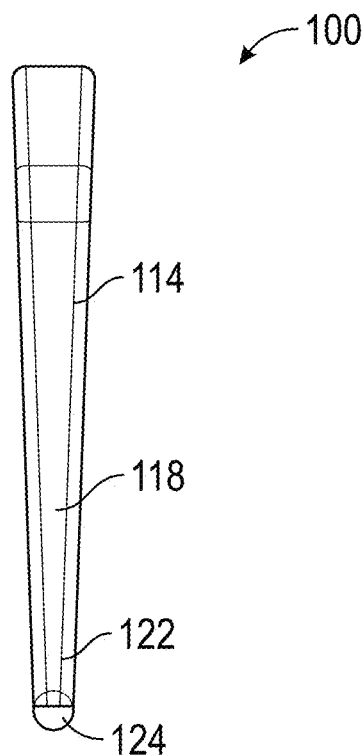
FIG. 2D is a front end view of the hair tool of FIG. 2A.
Figure 2E:
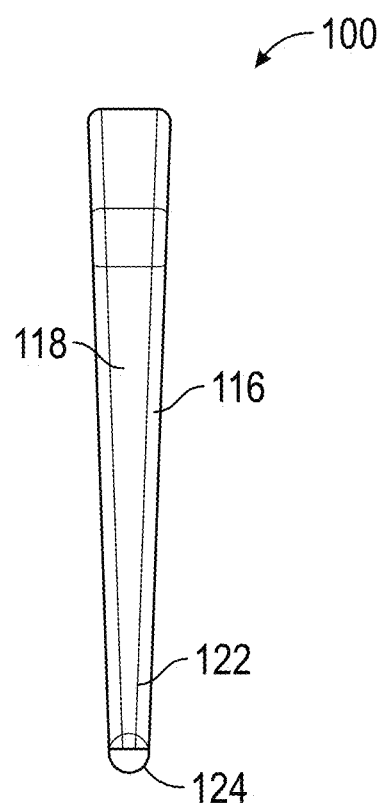
FIG. 2E is a rear end view of the hair tool of FIG. 2A.
Figure 2F:
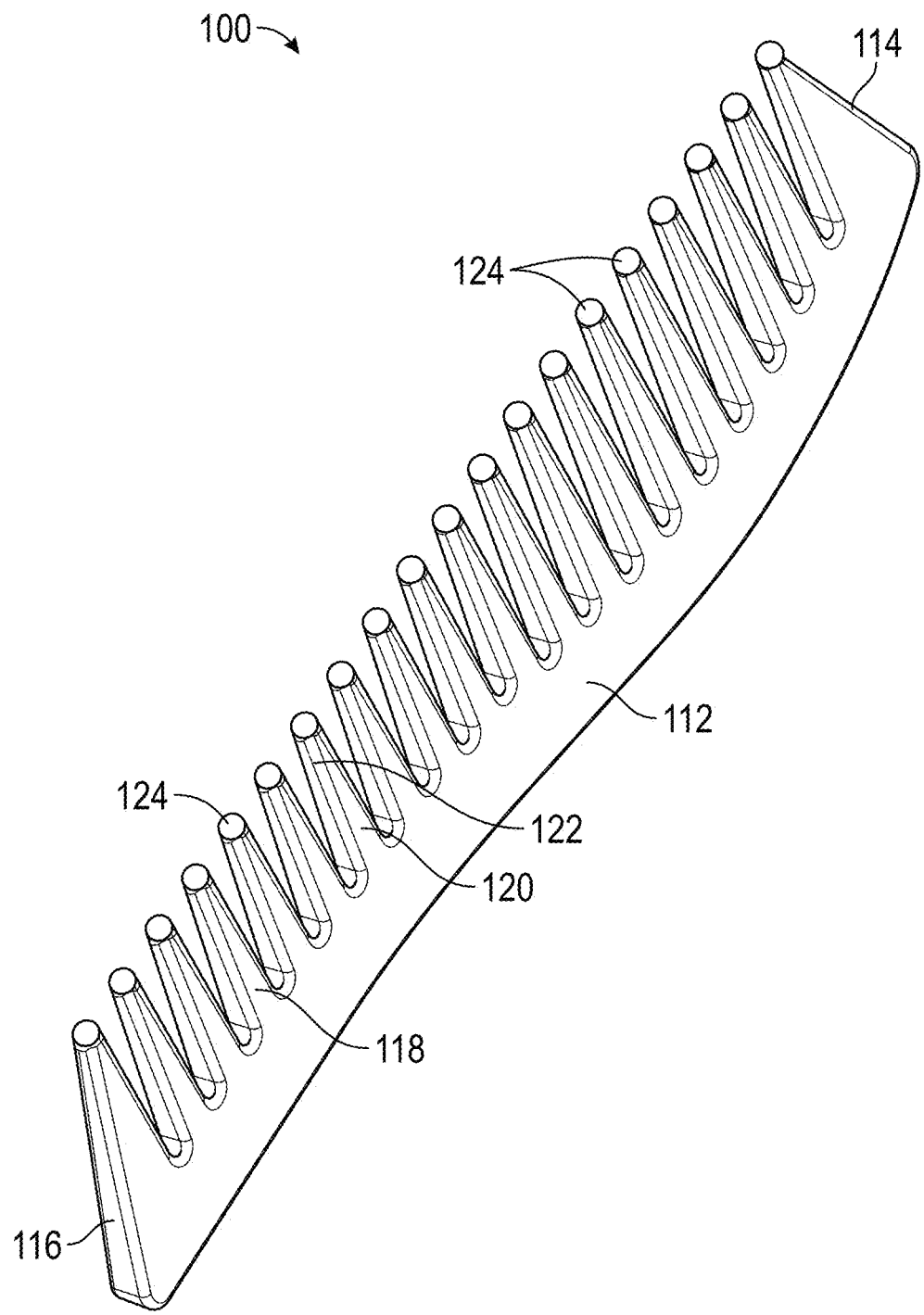
FIG. 2F is a first perspective view of the hair tool of FIG. 2A.
Figure 2G:
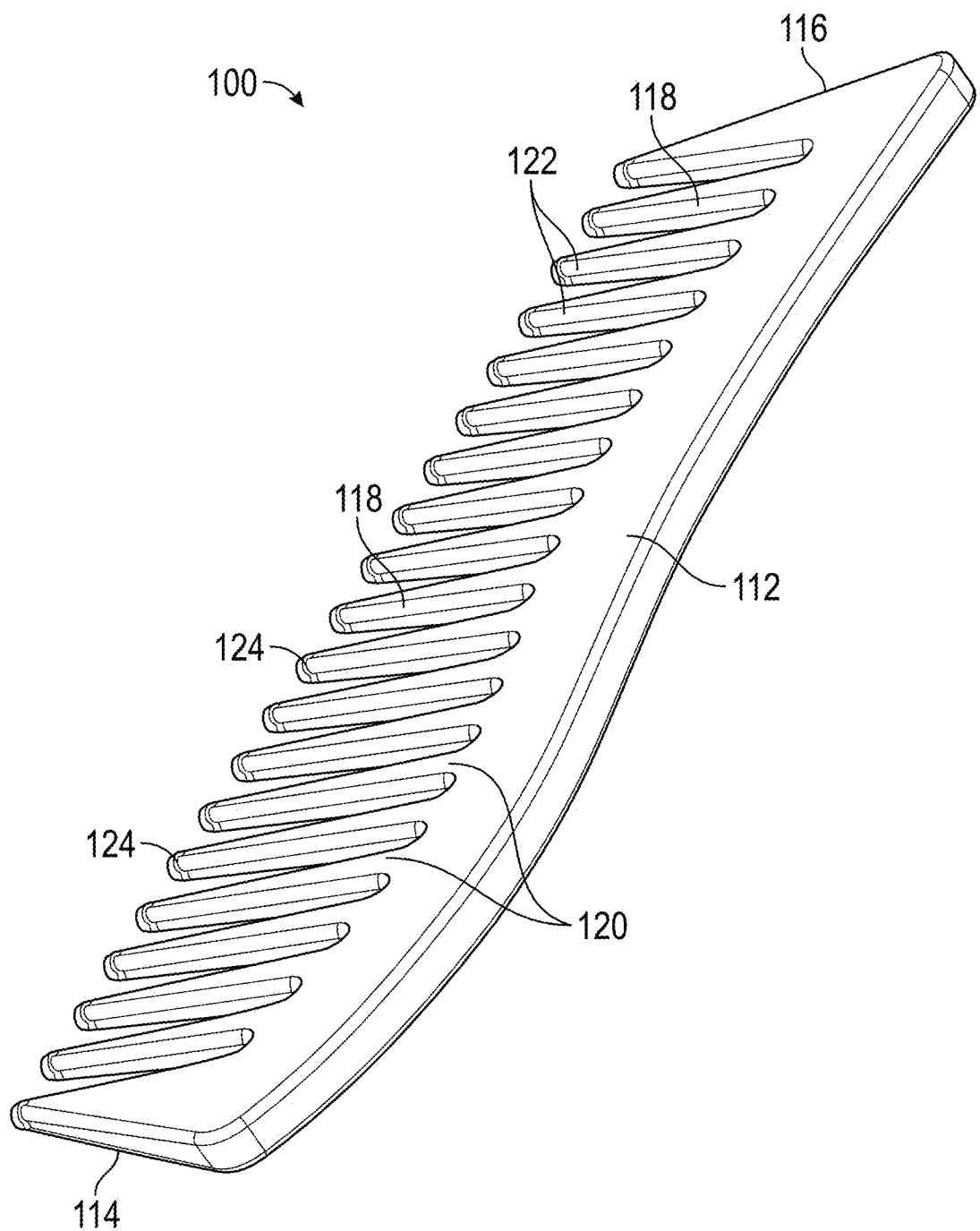
FIG. 2G is a second perspective view of the hair tool of FIG. 2A.

With reference to FIGS. 1A-1G, a hair tool 10 according to a first embodiment of the present invention is illustrated. As shown therein, the hair tool 10 generally takes the form of a grooming comb and has a spine or handle portion 12 having a first end. 14 and a second end 16, and a plurality of bristles or teeth 18 arranged in a row and extending from the handle portion 12 between the first end 14 and the second end 16. The teeth 18 each have a root portion 20 where the respective tooth is joined to the handle portion 12, and a distal tip 22 opposite the root portion 20. While the handle portion 12 is illustrated as being curved or arcuate in shape, it is contemplated that the handle portion 12 may be substantially linear or have any curved or ergonomic shape so as to be easily grasped by the hand of a user.

As shown in FIG. 1A, the hair tool 10, including the handle portion 12 and teeth 18, may be formed as a single, unitary piece using injection molding, additive manufacturing or other known processes, although it is contemplated that in some embodiments, the handle portion 12 and teeth 18 may be manufactured as separate components and coupled together via adhesive, fasteners and/or the like to form the hair tool 10. The hair tool 10 and components thereof are preferably formed from a plastic or polymer, although other materials such as metal may also be utilized without departing from the broader aspects of the invention.

Importantly, as discussed in detail hereinafter, the hair tool 10 may be formed with, or treated with, therapeutic agents or additives such as, for example, cannabidiol (CBD) and/or hemp seed oil. CBD is a cannabinoid extracted from *cannabis* plants, and may be used in a variety of ways for medicinal and therapeutic purposes. As disclosed by the present invention, these include the treatment of hair and skin by way of topical application. Hemp seed oil, derived from pressing seeds of hemp plants, as disclosed herein, may also be used for the treatment of hair and skin by way of topical application. Further to the above, in an embodiment, the hair tool may be formed via injection molding, whereby additives such as CBD and/or hemp seed oil, or other therapeutic agents, are added to the mold material prior to the injection molding process. It is further contemplated that the entire hair tool 10, one or more of the teeth 18, both the handle portion 12 and the teeth 18, or discrete portions of the hair tool 10 may contain the additive. For example, it is contemplated that just the distal ends 22 of the teeth, and/or the root portion 20 of the teeth, may be formed with the additive.

It is further contemplated that the hair tool 10 may be formed using additive manufacturing processes (i.e., 3D printing). Similar to the injection molding process described above, the 3D printing material may be modified to include the additive (i.e., the CBD or hemp seed oil, or other therapeutic material). The hair tool 10 may then be 3D printed such that the additive is distributed throughout the entire hair tool 10. Alternatively, selected, discrete portions of the hair tool 10 may be printed with the additive. For example, portions of the hair tool 10 (e.g., the handle portion 12) may be printed using a first material that does not contain CBD or hemp seed oil. Other portions (e.g., the teeth 18 or the distal ends 22 of the teeth 18) may then be printed using a second material that contains CBD or hemp seed oil (or other therapeutic agent). With 3D printing, material changeover may occur as an inline part of the 3D printing process, enabling precise customization of both hair tool shape/design, as well as precise control over the parts of the hair tool 10 that include the additive.

While it has been described above that the additive is added to the mold or 3D printing material, alternatively, one or more portions of the handle portion 12 and teeth 18 may by be porous such that such portions are cable of absorbing or being saturated with CBD or hemp seed oil subsequent to manufacture of the hair tool. In such embodiments, these portions of the hair tool 10 may be manufactured from an absorbent material and/or formed with a porous or microporous structure configured to retain CBD and hemp seed oil when contacted therewith.

Referring now to FIGS. 2A-2G, a hair tool 100 according to a second embodiment of the invention is illustrated. The hair tool 100 generally takes the form of a grooming comb and is substantially similar in configuration to the hair tool 10 described above, and similarly includes a spine or handle portion 112 having a first end 114 and a second end 116, and a plurality of bristles or teeth 118 arranged in a row and extending from the handle portion 112 between the first end 114 and the second end 116. The teeth 118 each have a root portion 120 where the respective tooth is joined to the handle portion 112, and a distal tip 122 opposite the root portion 120. As illustrated therein, the distal ends 122 of some or all of the teeth 118 may include a ball-shaped or spherical tip 124. It is contemplated that the spherical tips 124 may be formed from any process known in the art, such as via dipping, molding or the like.

As with the hair tool of FIGS. 1A-1G, the hair tool 100 may be manufactured from a plastic or polymer (or metal), and may be formed using injection molding or additive manufacturing processes. Similarly, as described above, the hair tool 100, handle portion 112, teeth 118, tip 24 or various portions of the hair tool 100 may be formed with or treated with additives, including CBD or hemp seed oil, as described above. In an embodiment, each spherical tip 124 may be formed with, or treated with, a therapeutic agent such as CBD or hemp seed oil. For example, each tip 124 may be formed by dipping the distal ends 122 of the teeth into a material containing a CBD or hemp seed oil additive. Alternatively, one or more portions of the hair tool 100 (e.g., the spherical tips 124) may be porous and may be saturated with CBD or hemp seed oil subsequent to manufacture.

Turning now to FIGS. 3A-3G, a hair tool 300 according to a third embodiment of the invention is illustrated. As shown therein, the hair tool 300 generally takes the form of a grooming brush and has a handle 310 having a first end 312 and a second end 314, and a head 316 integrally formed with the handle 310 at the first end 312. While the head 316 is disclosed as being integrally formed with the handle 310, it is contemplated that the head 316 and the handle 310 may be formed as separate components that are interconnected or joined using fasteners, and adhesive, mechanical means or the like. Similar to the embodiments described above, the hair tool 300 may be formed via a variety of methods known in the art such as, for example, injection molding or additive manufacturing.

Figure 3B:
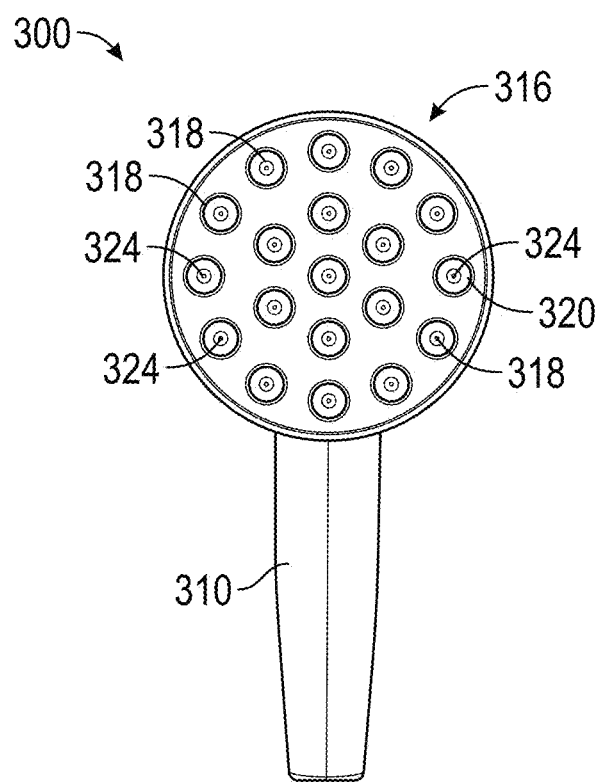
FIG. 3B is a second side view of the hair tool of FIG. 3A.
Figure 3A:
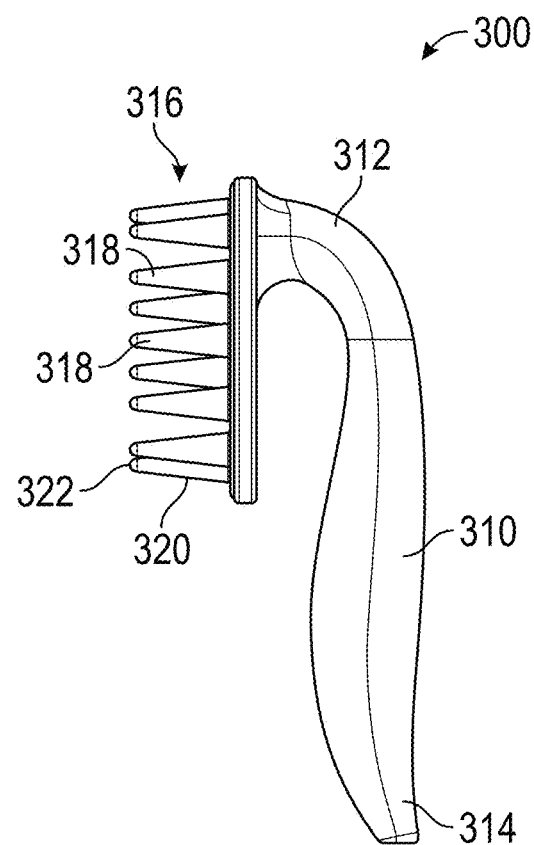
FIG. 3A is a first side view of a hair tool according to a third embodiment the present invention.
Figure 3C:
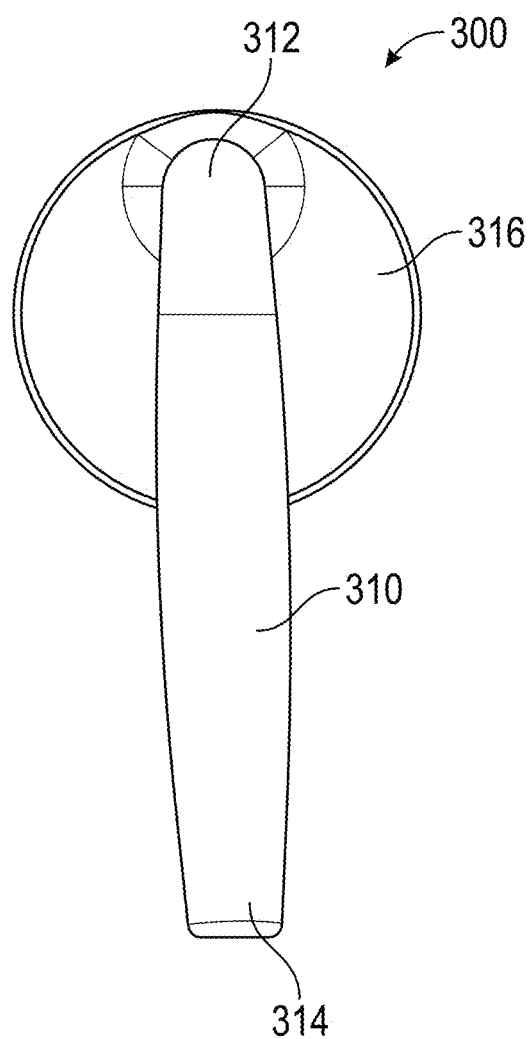
FIG. 3C is a third side view of the hair tool of FIG. 3A.
Figure 3D:
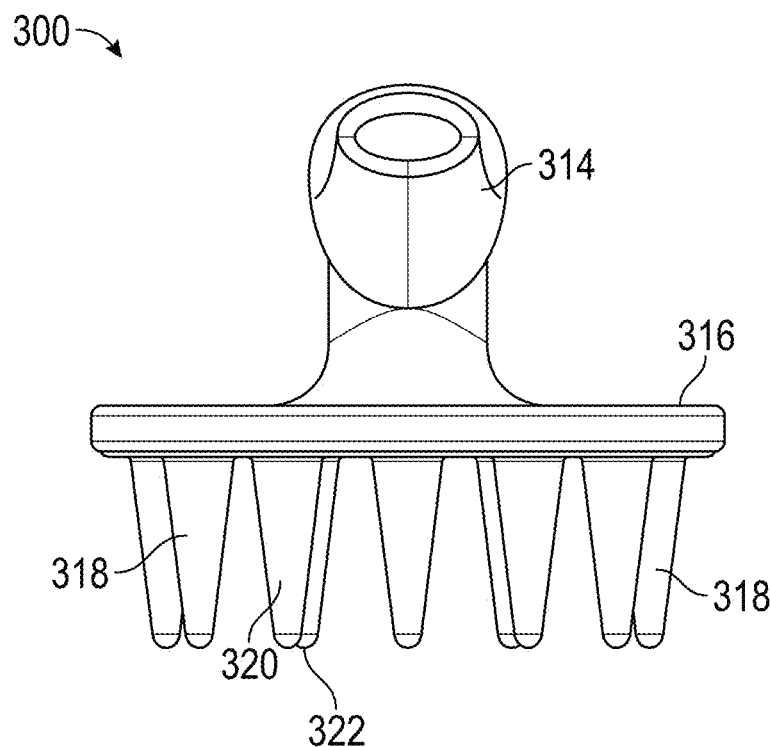
FIG. 3D is a front end view of the hair tool of FIG. 3A.
Figure 3E:
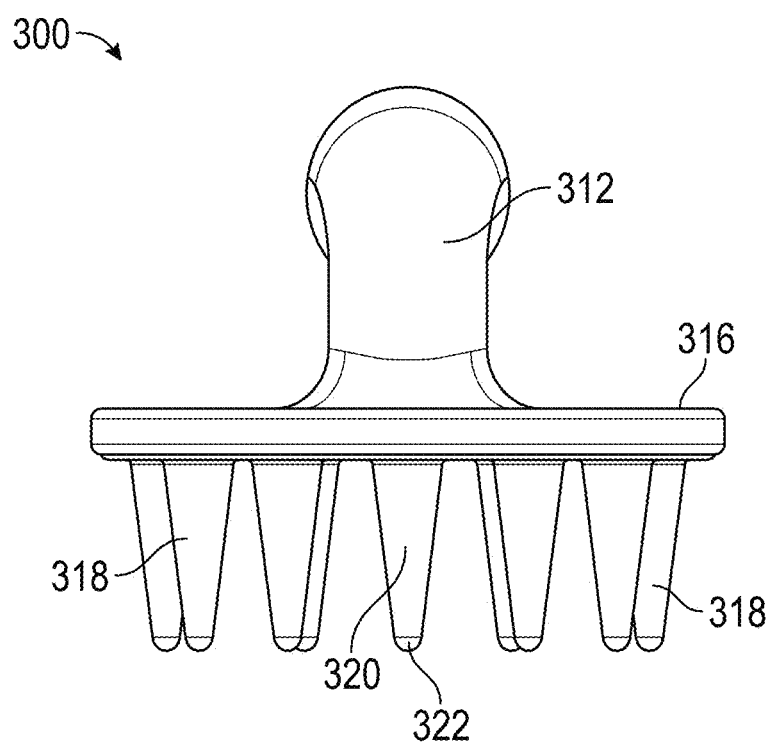
FIG. 3E is a rear end view of the hair tool of FIG. 3A.
Figure 3F:
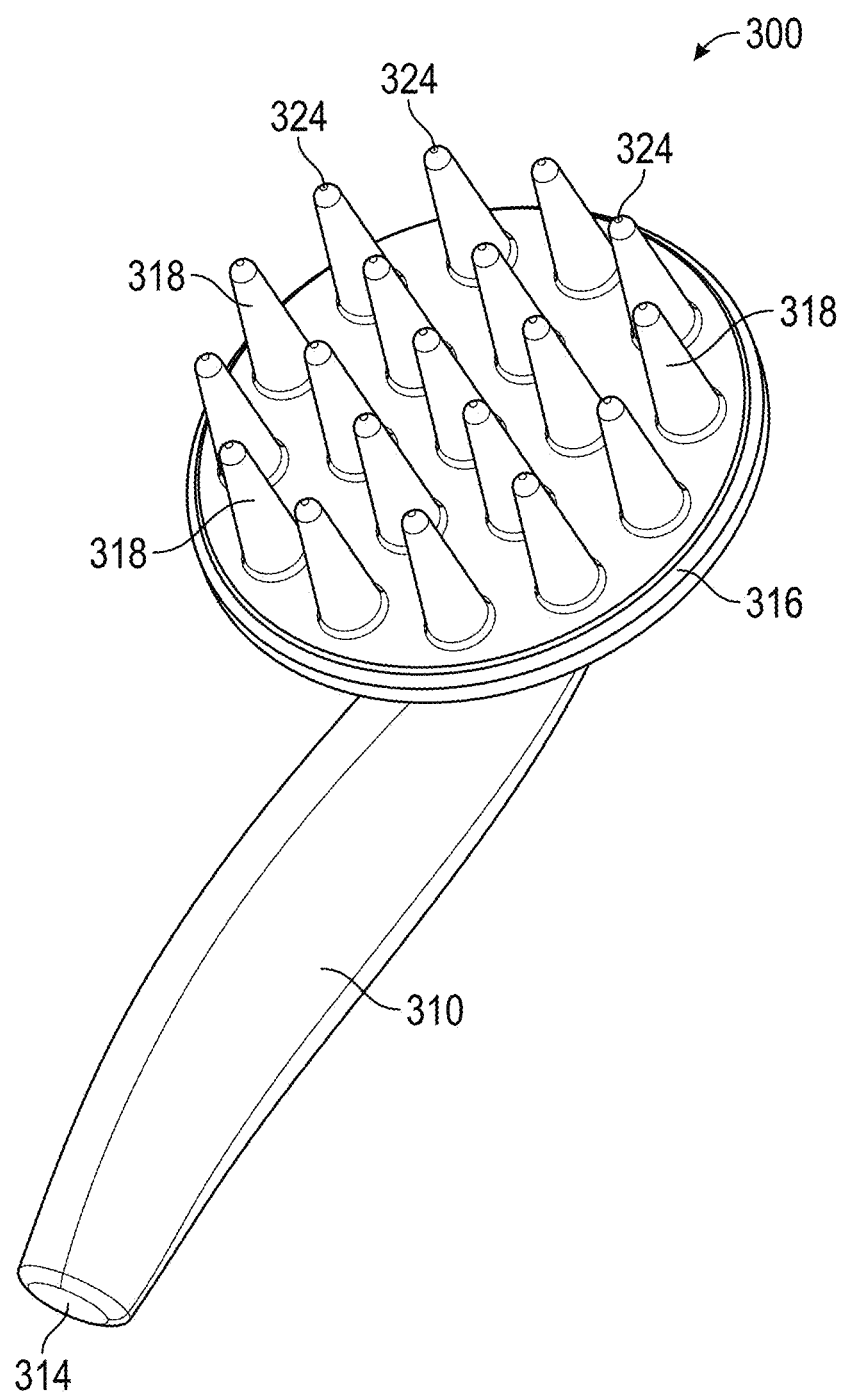
FIG. 3F is a first perspective view of the hair tool of FIG. 3A.
Figure 3G:
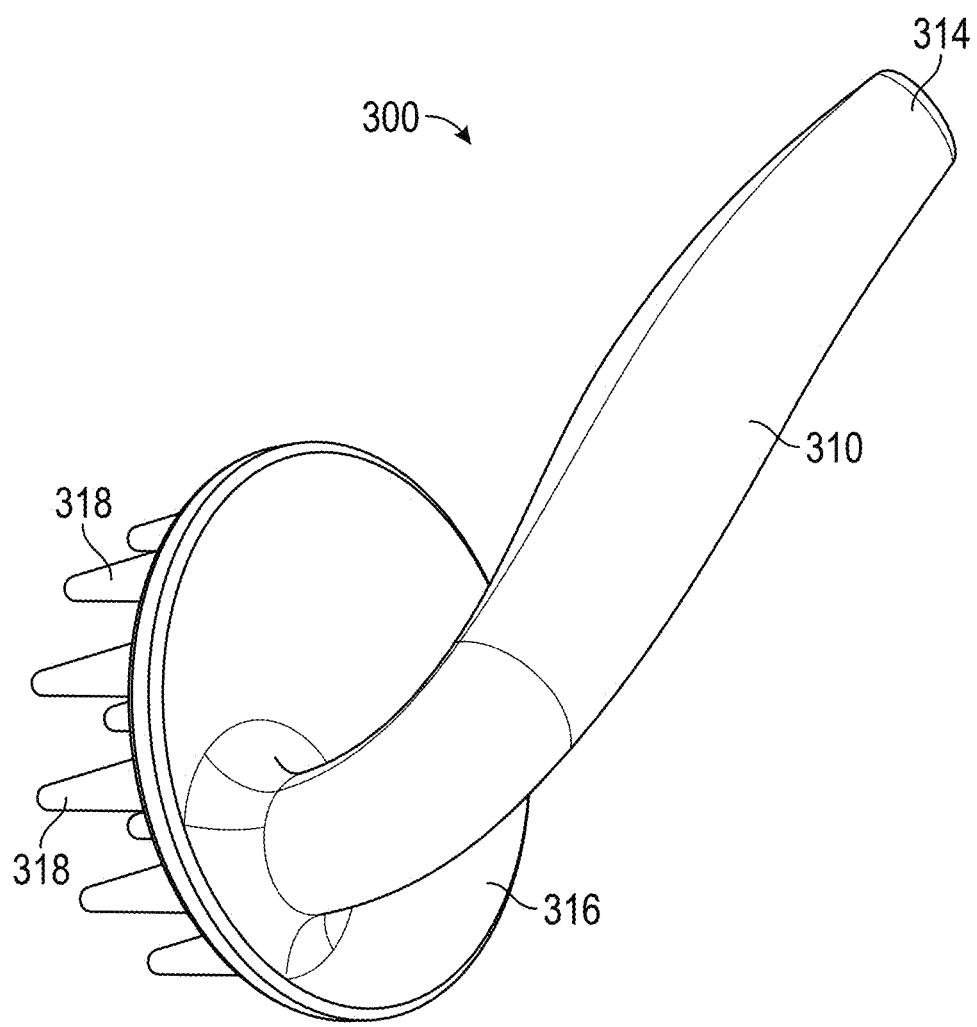
FIG. 3G is a second perspective view of the hair tool of FIG. 3A.

As best shown in FIGS. 3A and 3B, the head 316 is generally circular in shape and includes a plurality of semi-flexible or deformable bristles 318 attached to, or integrally formed with the head 316. The bristles 318 may each include a body or root portion 320 and a distal tip 322. In an embodiment, some or all of the bristles 318 are generally hollow and have a distal aperture or hole 324 in the distal tip 322 providing fluid communication with the hollow interior of the body portion 320 of the bristles 318. Each distal tip 322 may be made of rubber or rubber-like (i.e., resilient) material to impart massaging pressure to a user's skin or scalp during use.

Importantly, the distal tips 322 are formed with, infused with, impregnated with, or treated with a therapeutic agent or additive, such as CBD or hemp seed oil, as disclosed above. For example, the therapeutic agent may be added to the Plowable material prior to forming/molding/3D printing into the bristle shape. Alternatively, or in addition, each bristle 318 and/or tip 322 may be filled with a therapeutic agent such as CBD or hemp seed oil. In this respect, the body portion 230 and/or distal tip 322 of the bristles 318 functions as a reservoir for the therapeutic agent. In use, the therapeutic agent/additive is controllable released from each bristle 318 through the distal aperture 324 when the tips 322 are pressed against a user's scalp or skin.

In an embodiment, it is contemplated that the handle 310 and/or head 316 may be generally hollow and in fluid communication with the interior of the bristles 318. The handle 310 and/or head 316 may also include a closeable port (not shown) that allows for refilling of the hair tool 300 with therapeutic agent. In use, the therapeutic agent flows from the handle 310 and/or head 315, into the bristles 318, and out of the distal apertures 324.

Referring now to FIGS. 4A-4G, a hair tool 400 according to another embodiment of the present invention is illustrated. As shown therein, the hair tool 400 generally takes the form of a grooming brush and has a handle 410 having a first end 412 and a second end 414, and a head 416 integrally formed with the handle 410 at the first end 412. While the head 416 is disclosed as being integrally formed with the handle 410, it is contemplated that the head 416 and the handle 410 may be formed as separate components that are interconnected or joined using fasteners, and adhesive, mechanical means or the like. Similar to the embodiments described above, the hair tool 400 may be formed via a variety of methods known in the art such as, for example, injection molding or additive manufacturing.

Figure 4B:
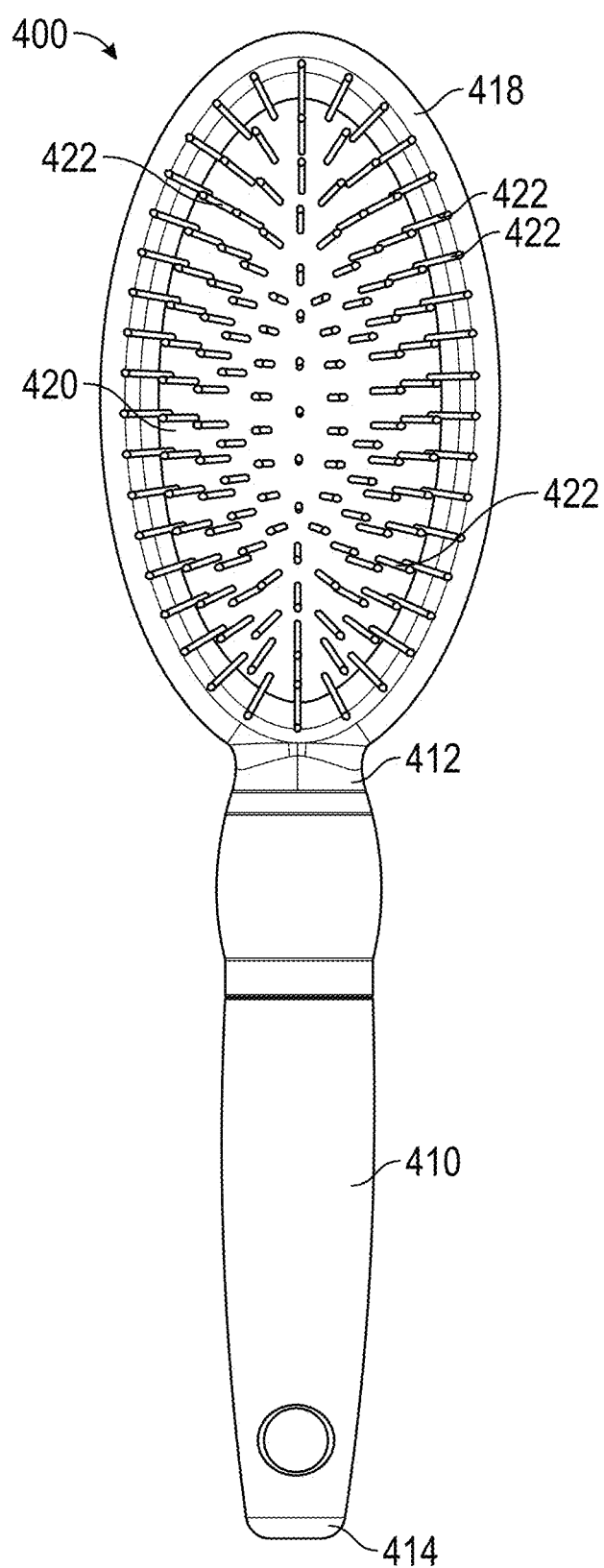
FIG. 4B is a second side view of the hair tool of FIG. 4A.
Figure 4A:
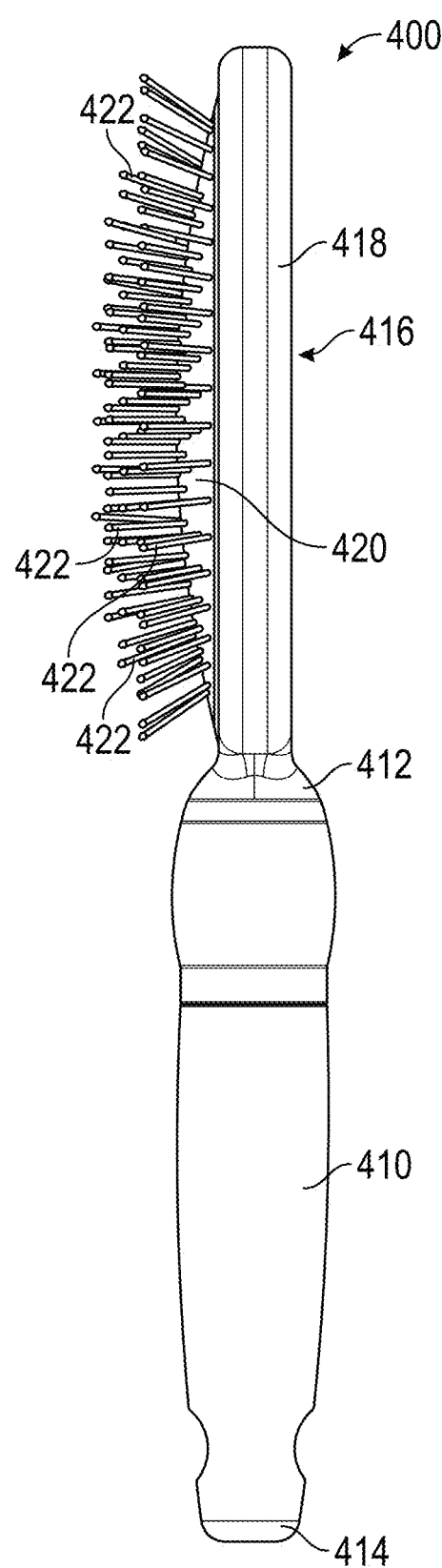
FIG. 4A is a first side view of a hair tool according to a fourth embodiment the present invention.
Figure 4C:
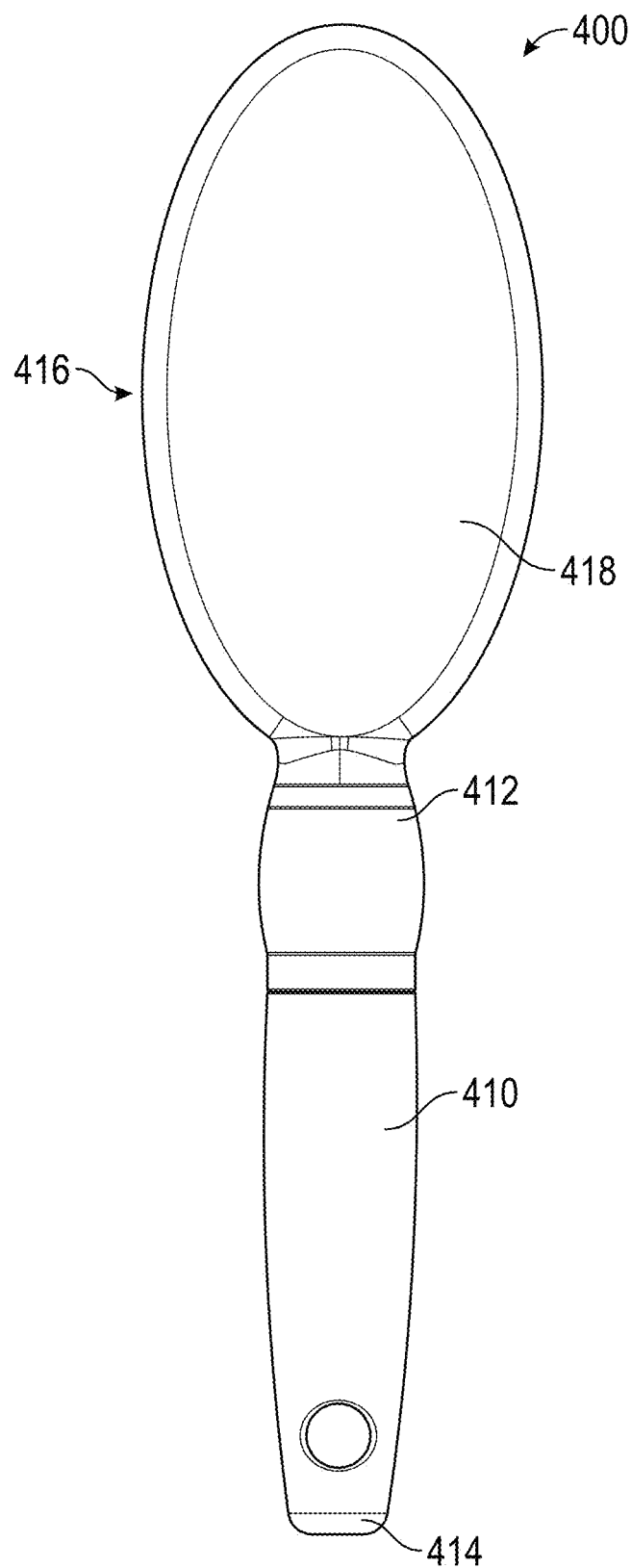
FIG. 4C is a third side view of the hair tool of FIG. 4A.
Figure 4D:
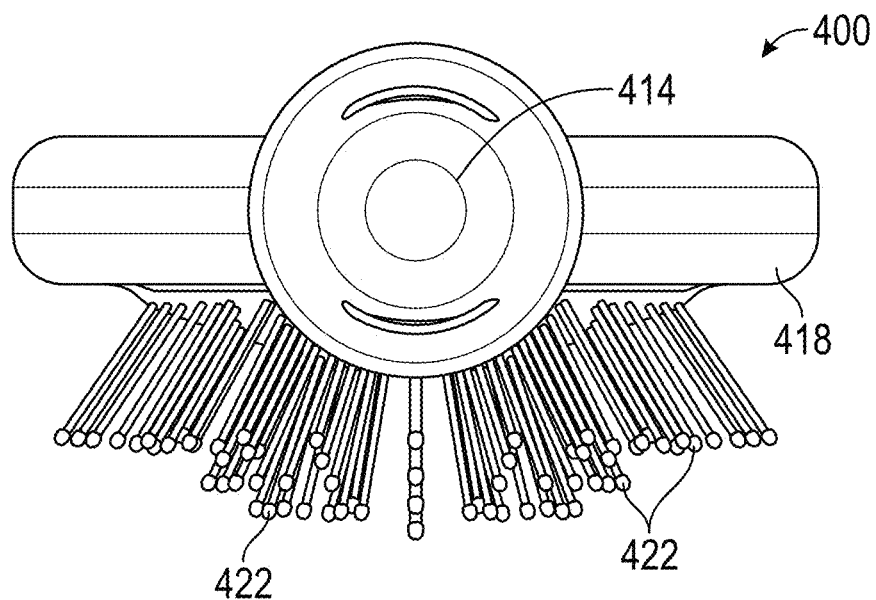
FIG. 4D is a front end view of the hair tool of FIG. 4A.
Figure 4E:
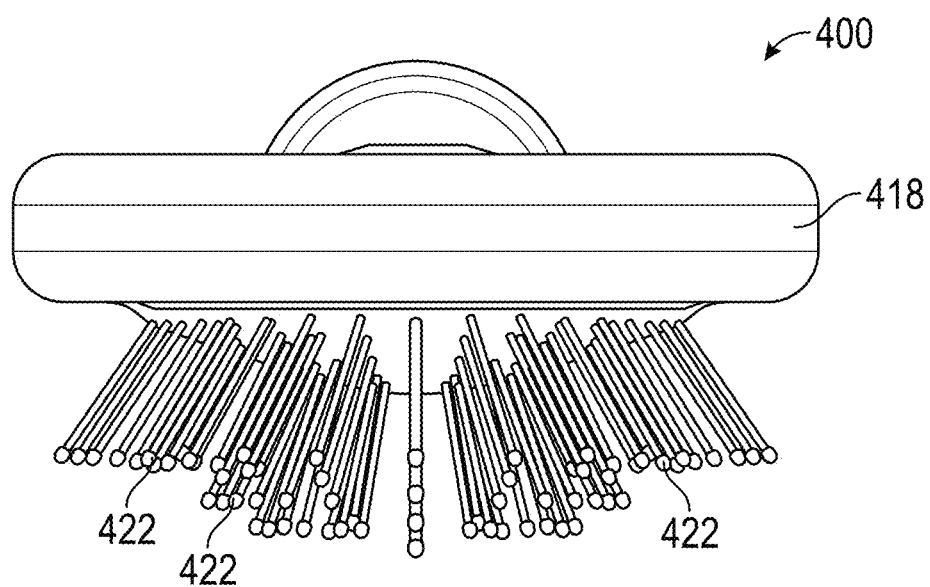
FIG. 4E is a rear end view of the hair tool of FIG. 4A.
Figure 4F:
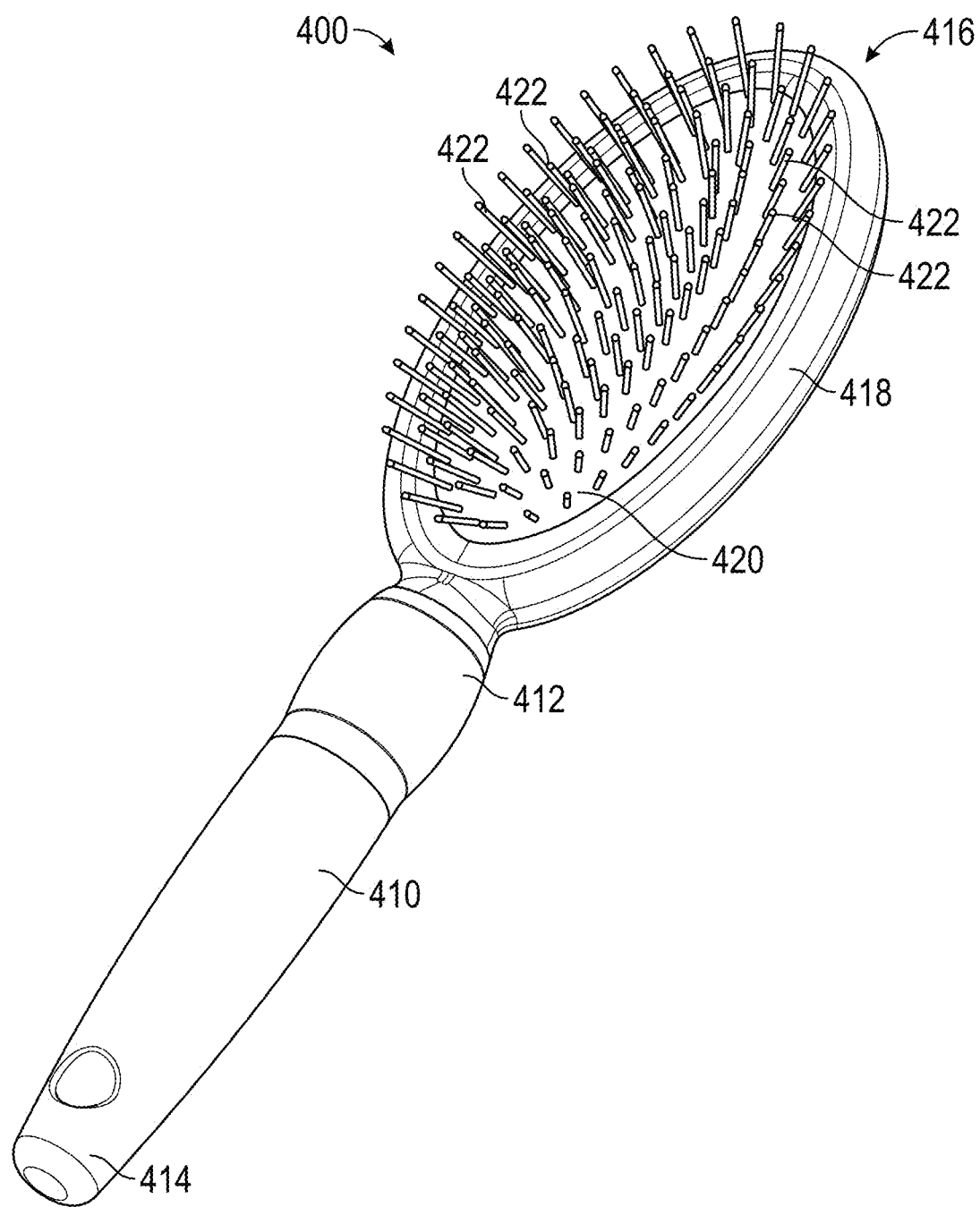
FIG. 4G is a second perspective view of the hair tool of FIG. 4A.
Figure 4G:
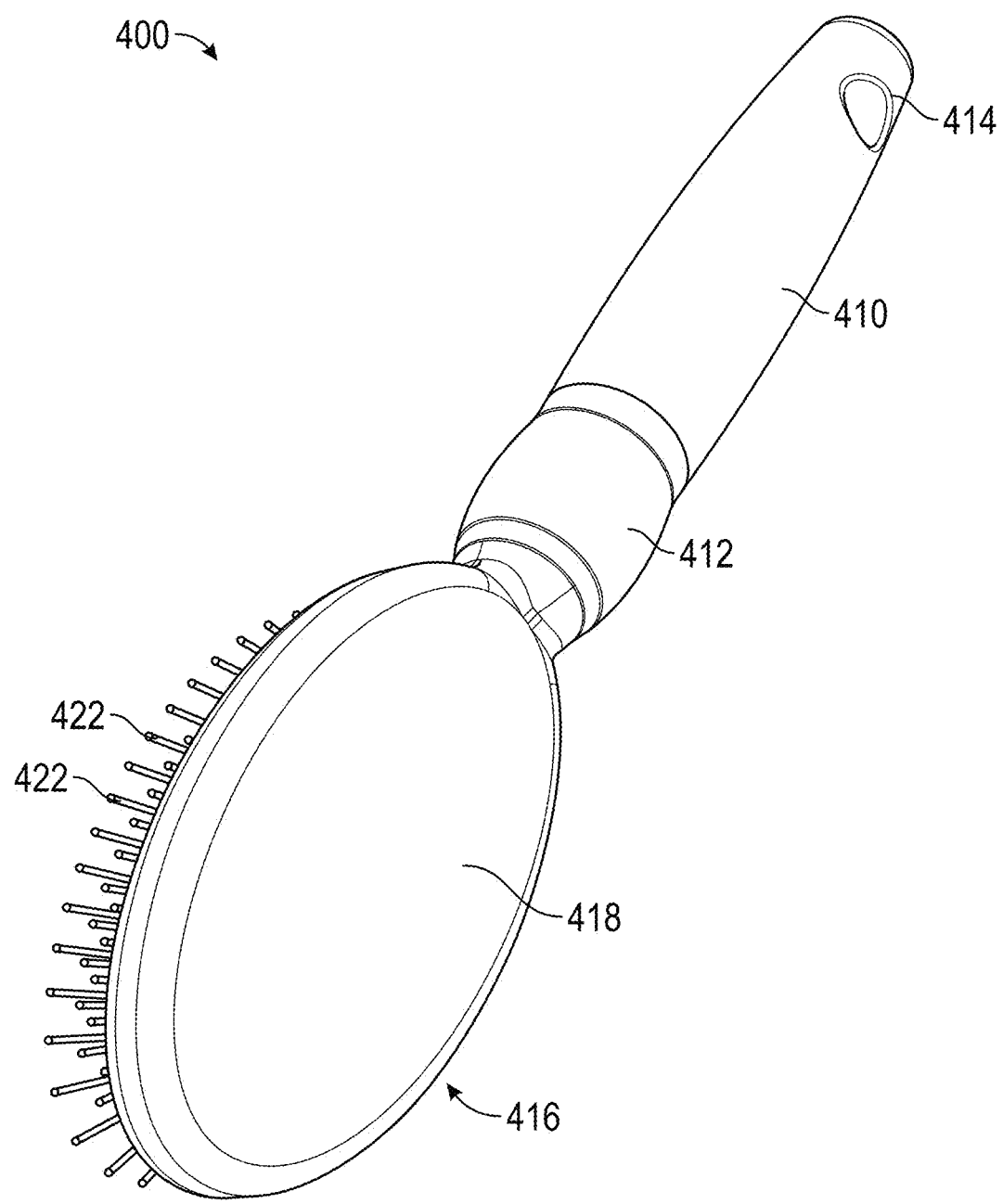

As best shown in FIGS. 4A and 4B, the head 416 is preferably oval in shape, although the head 416 may take any desired shape without departing from the broader aspects of the invention. The head 416 includes a back plate 418 extending from the handle 410 in a direction substantially parallel from the handle 410, a bristle cushion 420 connected to a front face of the back plate 418, and a plurality of bristles 422 mounted in the bristle cushion 420 and extending therefrom. The bristle cushion 420 may be of the type known in the art, and is flexible to enable the bristles 422 to flex relative to the user's head during use, and enable the base or root of each bristle 422, and thus the effective depth of each bristle, to vary as the cushion 420 flexes in response to forces transmitted from the user's head through each bristle 422. In an embodiment, the bristles 422 may be flexible or substantially stiff or rigid.

Similar to the embodiments described above, the cushion 420 and bristles 422 may be manufactured with one or more therapeutic agent additives, such as CBD or hemp seed oil. Alternatively, the cushion 420 and/or bristles may be infused with, impregnated with, or saturated with such therapeutic agent after manufacture. In an embodiment, the bristles 422 may have ball-shaped tips configured to retain the therapeutic agent (via an absorbent material, porous structure, etc.). Alternatively, the ball-shaped tips may be generally hollow and include an aperture for releasing the therapeutic agent. In an embodiment, the interior of the cushion 420 (i.e., between the cushion 420 and the back plate 418) may define a reservoir containing the therapeutic agent for release during use.

Referring now to FIGS. 5A-5F, a hair tool 500 according to another embodiment of the present invention is illustrated. As shown therein, the hair tool 500 generally takes the form of a grooming brush and has a handle 510 having a first end 512 and a second end 514, and a head 516 integrally formed with the handle 410 at the first end 512. While the head 516 is disclosed as being integrally formed with the handle 510, it is contemplated that the head 516 and the handle 510 may be formed as separate components that are interconnected or joined using fasteners, and adhesive, mechanical means or the like. Similar to the embodiments described above, the hair tool 500 may be formed via a variety of methods known in the art such as, for example, injection molding or additive manufacturing.

Figure 5C:
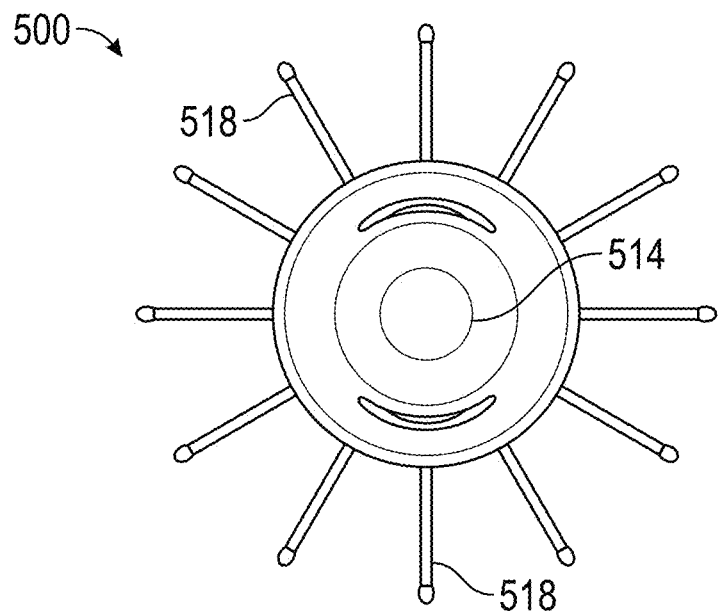
FIG. 5C is a front end view of the hair tool of FIG. 5A.
Figure 5D:
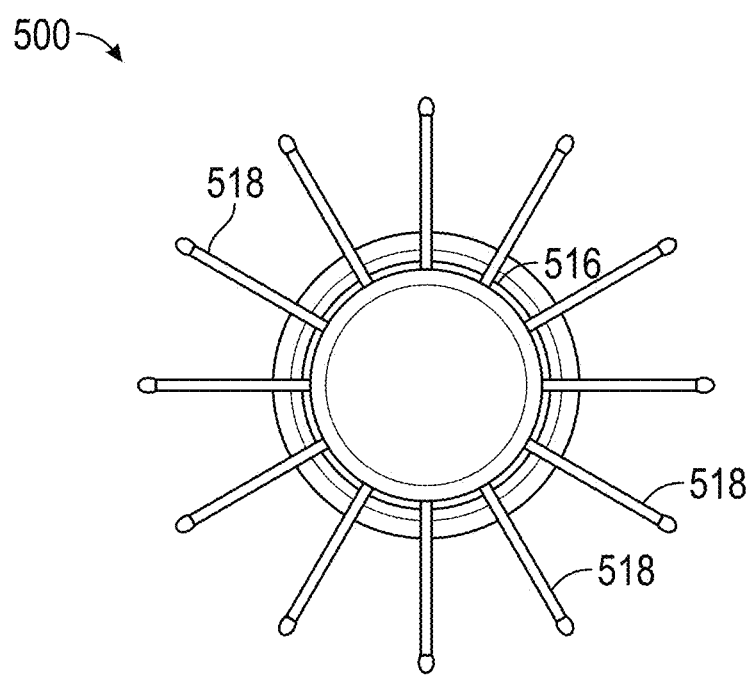
FIG. 5D is a rear end view of the hair tool of FIG. 5A.
Figure 5E:
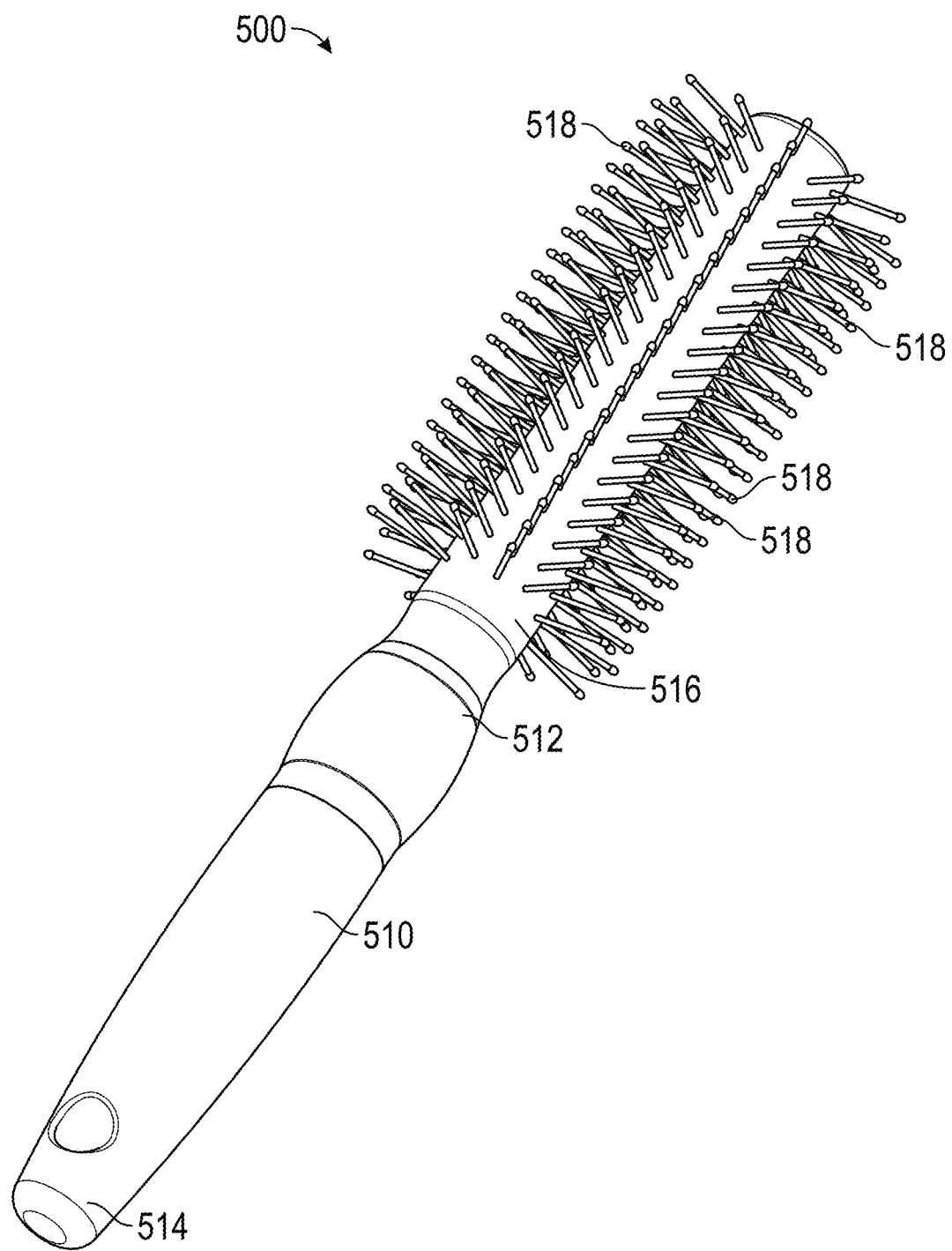
FIG. 5E is a first perspective view of the hair tool of FIG. 5A.
Figure 5F:
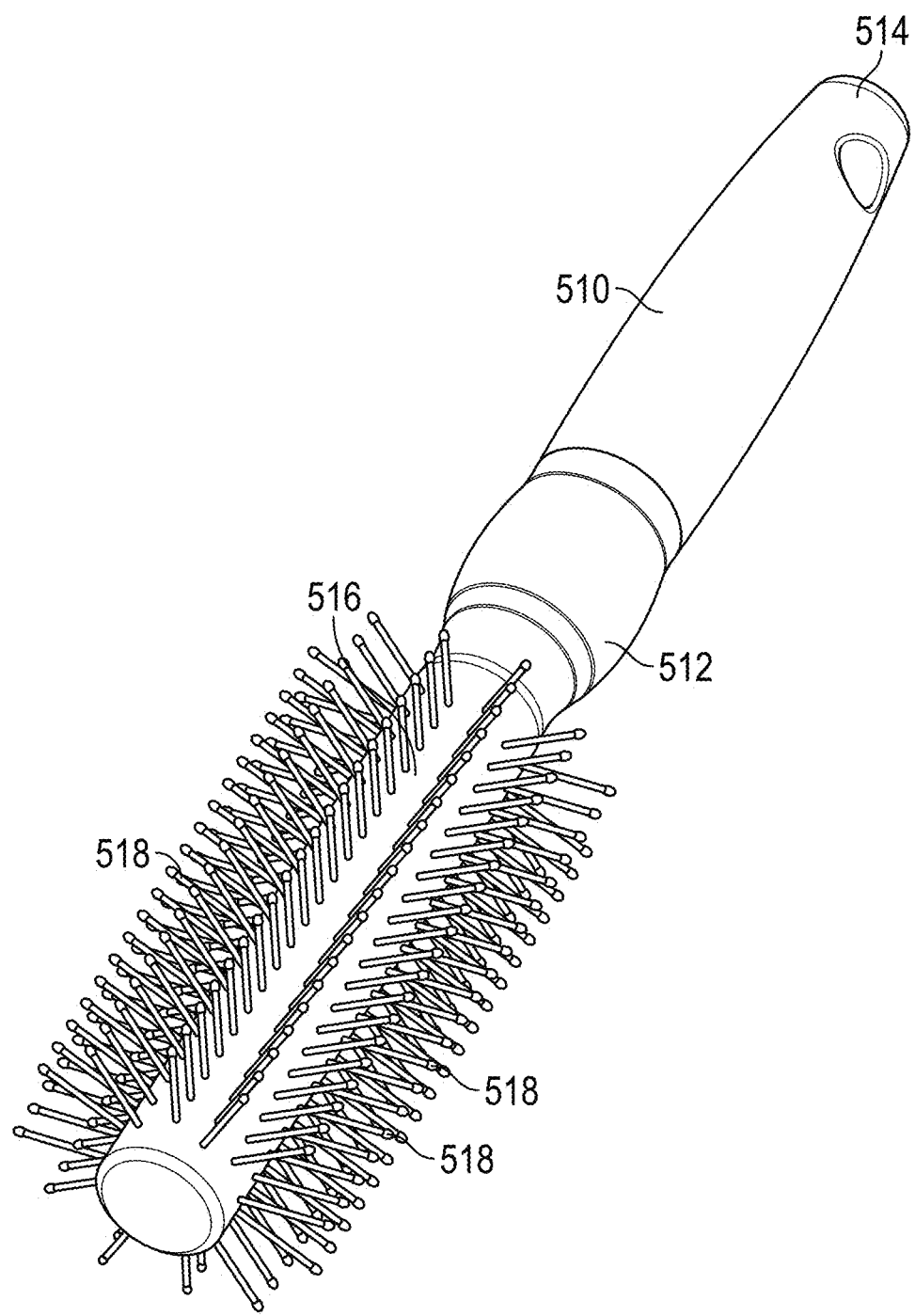
FIG. 5F is a second perspective view of the hair tool of FIG. 5A.

As best shown in FIGS. 5A and 5B, the head 516 is preferably cylindrical in shape, although the head 516 may take any desired shape without departing from the broader aspects of the invention. The head 516 also includes a plurality of bristles 518 extending radially therefrom. As shown in FIGS. 5C and 5D, the bristles 518 may extend substantially 360 degrees around the periphery of the head 516. The bristles 518 may be flexible or substantially rigid/stiff. It is contemplated that the brush 500 or its constituent components may be manufactured from plastic or polymers via one of, or a combination of, injection molding, additive manufacturing and like processes.

Similar to the embodiments described above, the head 516 and/or bristles 518 may be manufactured with one or more therapeutic agent additives, such as CBD or hemp seed oil. Alternatively, the head 516 and bristles 518 may be infused with, impregnated with, or saturated with such therapeutic agent after manufacture. In an embodiment, the bristles 518 may have ball-shaped tips configured to retain the therapeutic agent (via an absorbent material, porous structure, etc.). Alternatively, the ball-shaped tips may be generally hollow and include an aperture for releasing the therapeutic agent. In an embodiment, the head 516 may be generally hollow, forming a reservoir containing the therapeutic agent for release during use (either from the head 516, itself, or through bristles 518).

FIGS. 6A-6F illustrate a hair tool 600 according to another embodiment of the present invention is illustrated. The hair tool 600 is generally similar to the hair tool 500 of FIGS. 5A-5F, and generally takes the form of a grooming brush. The hair tool 600 includes a handle 610 having a first end 612 and a second end 614, and a head 616 integrally formed with the handle 610 at the first end 612. While the head 616 is disclosed as being integrally formed with the handle 610, it is contemplated that the head 616 and the handle 610 may be formed as separate components that are interconnected or joined using fasteners, and adhesive, mechanical means or the like. Similar to the embodiments described above, the hair tool 600 may be formed via a variety of methods known in the art such as, for example, injection molding or additive manufacturing.

Figure 6B:
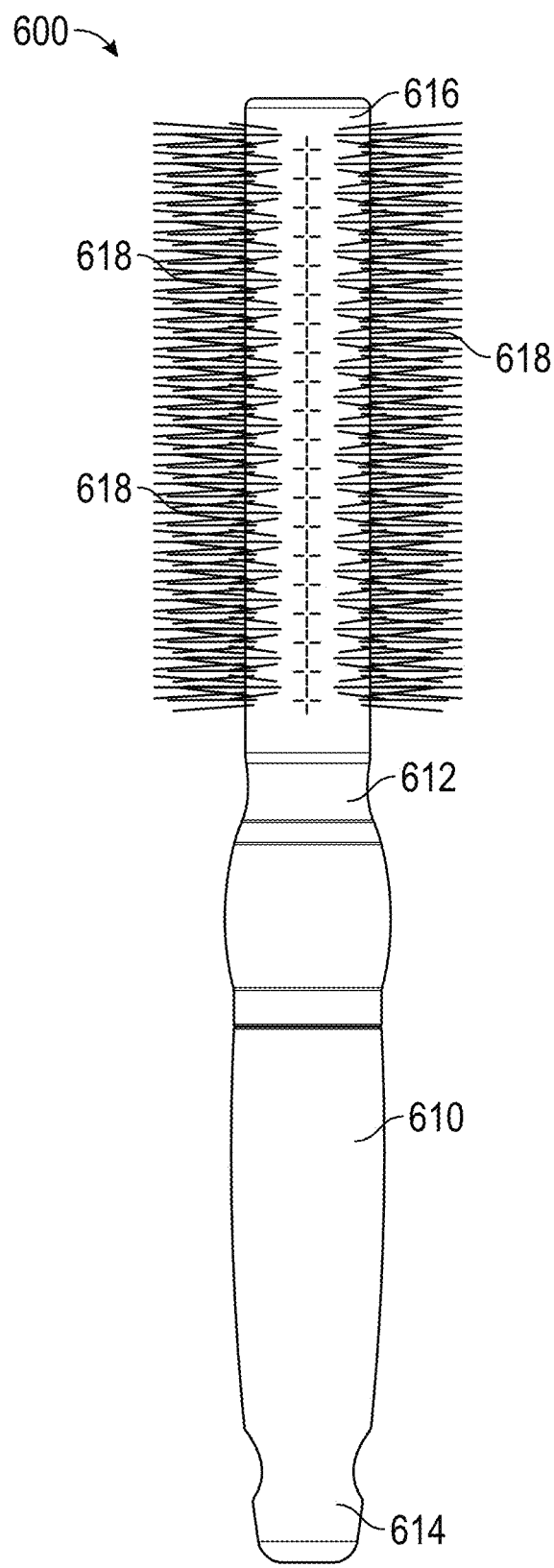
FIG. 6B is a second side view of the hair tool of FIG. 6A.
Figure 6A:
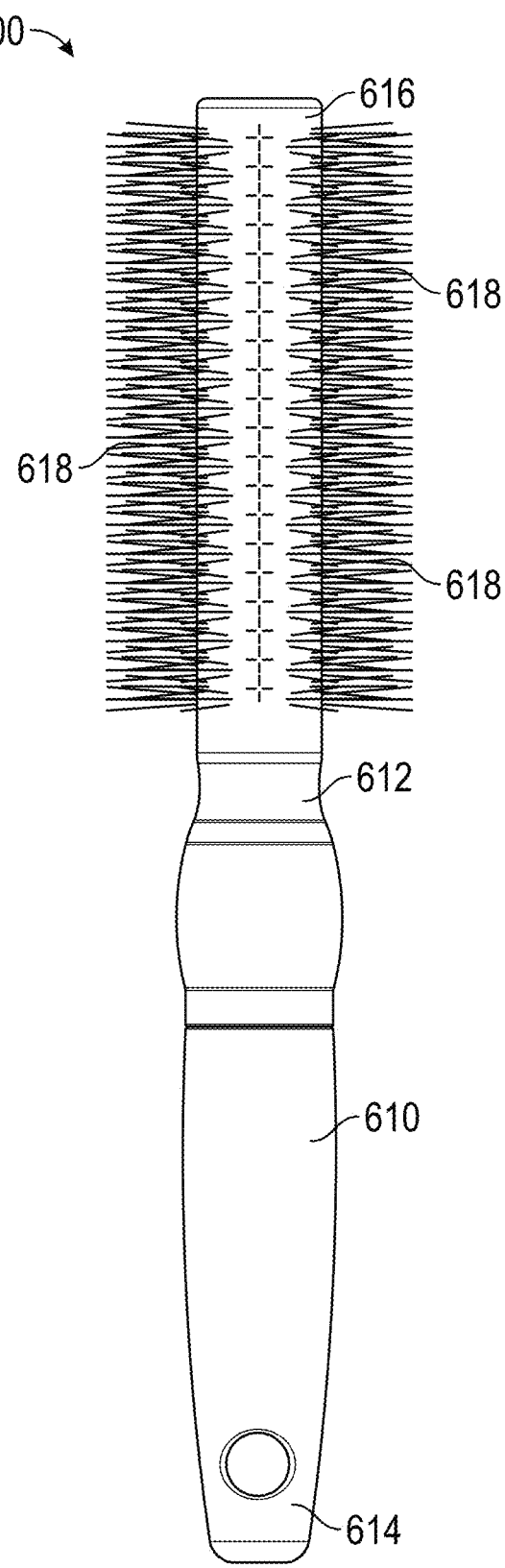
FIG. 6A is a first side view of a hair tool according to a sixth embodiment of the present invention.
Figure 6C:
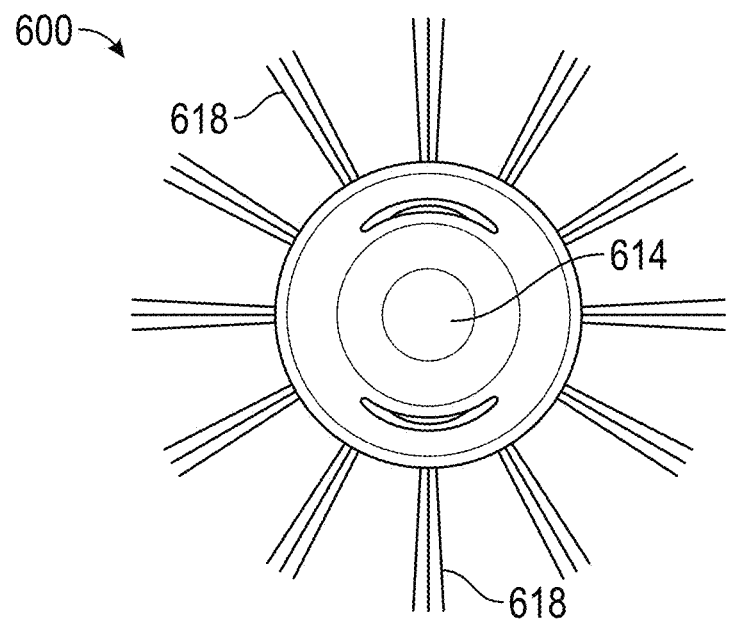
FIG. 6C is a front end view of the hair tool of FIG. 6A.
Figure 6D:
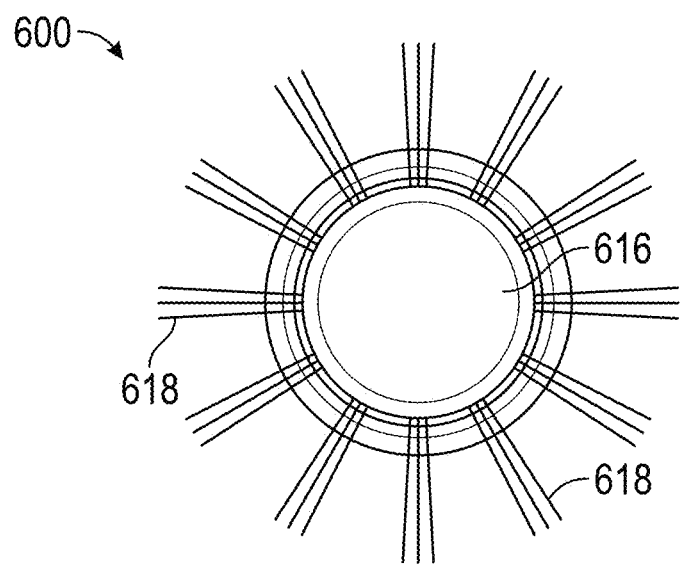
FIG. 6D is a rear end view of the hair tool of FIG. 6A.
Figure 6E:
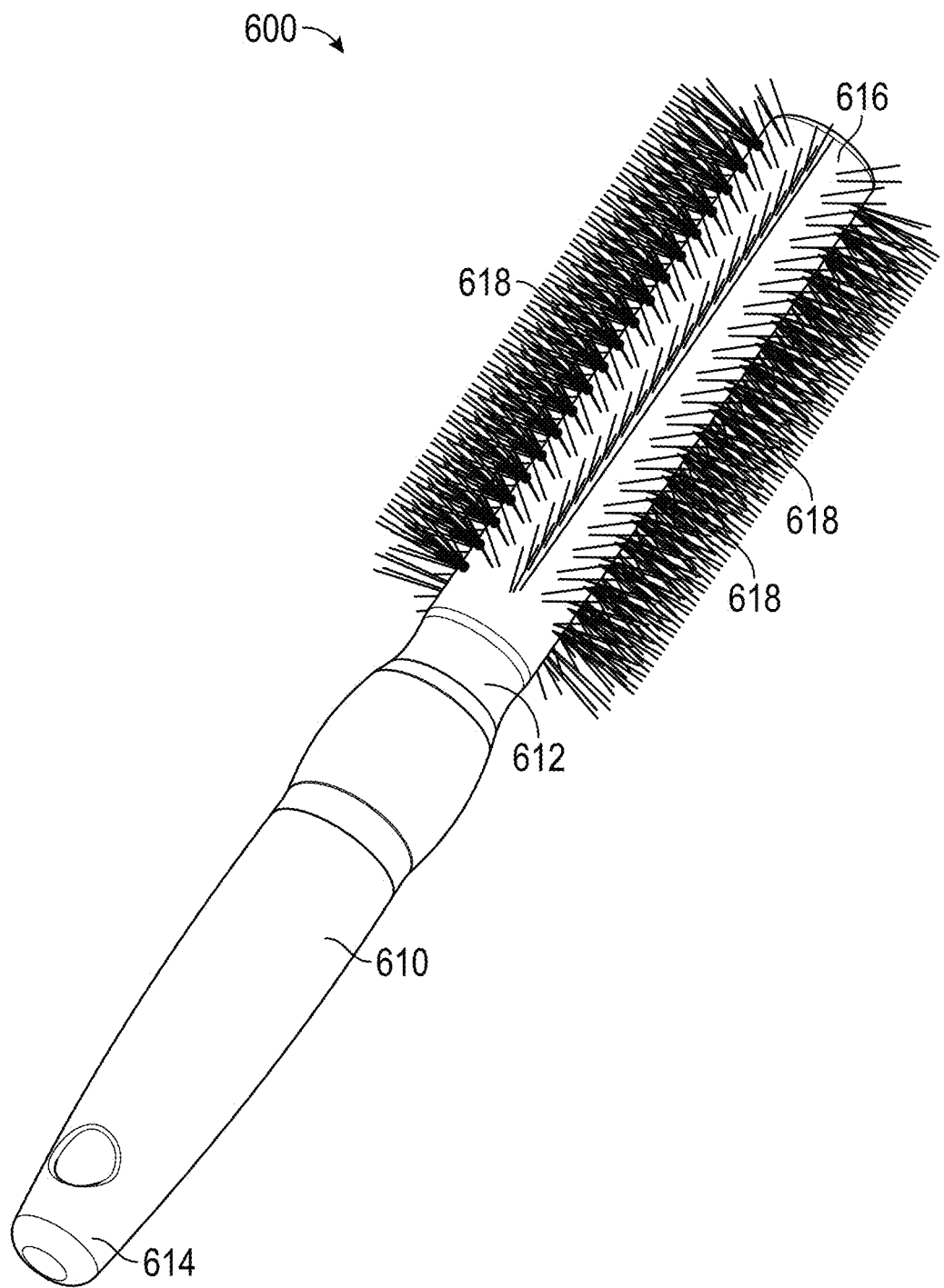
FIG. 6E is a first perspective view of the hair tool of FIG. 6A.
Figure 6F:
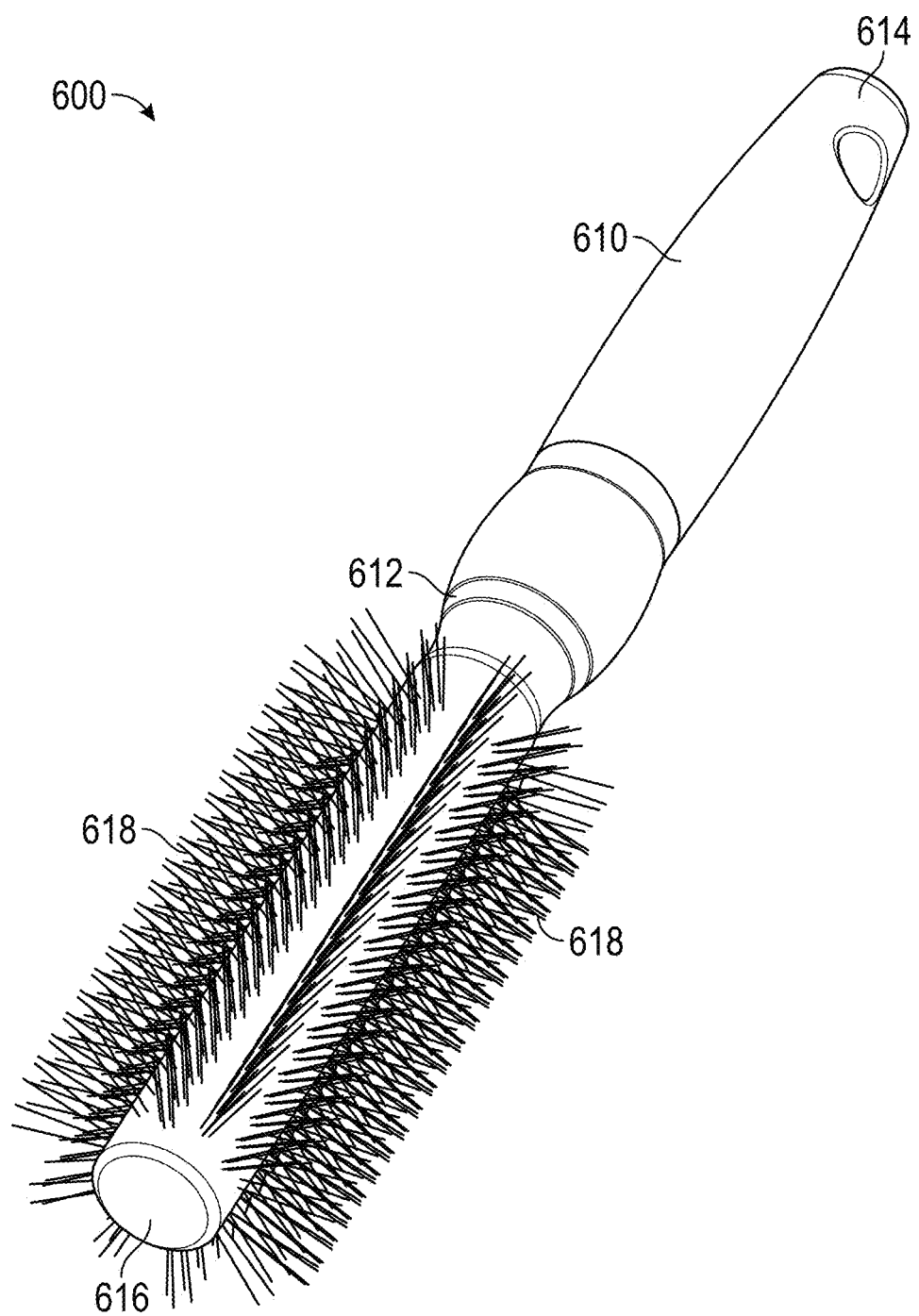
FIG. 6F is a second perspective view of the hair tool of FIG. 6A.

As best shown in FIGS. 6A and 6B, the head 616 is preferably cylindrical in shape, although the head 616 may take any desired shape without departing from the broader aspects of the invention. The head 616 also includes a plurality of bristles 618 extending radially therefrom. As shown in FIGS. 6C and 6D, the bristles 618 may extend substantially 360 degrees around the periphery of the head 616. The bristles 618 may be flexible or substantially rigid/stiff. It is contemplated that the brush 600 or its constituent components may be manufactured from plastic or polymers via one of, or a combination of, injection molding, additive manufacturing and like processes.

Similar to the embodiments described above, the head 616 and bristles 618 may be manufactured with one or more therapeutic agent additives, such as CBD or hemp seed oil. Alternatively, the head 616 and bristles 618 may be infused with, impregnated with, or saturated with such therapeutic agent after manufacture. In connection with this, in an embodiment, the bristles 618 may be formed from an absorbent material such as, for example, natural hair (e.g., boar hair) or synthetic materials such as nylon, so that they may be saturated or soaked prior to use with one or more additives as described above, such as CBD or hemp seed oil.

Turning finally to FIGS. 7A-7G, a hair tool 700 according to yet another embodiment of the present invention is illustrated. As shown therein, the hair tool 700 generally takes the form of a grooming brush and has a handle 710 having a first end 712 and a second end 714, and a head 716 integrally formed with the handle 710 at the first end 712. While the head 716 is disclosed as being integrally formed with the handle 710, it is contemplated that the head 416 and the handle 710 may be formed as separate components that are interconnected or joined using fasteners, and adhesive, mechanical means or the like. Similar to the embodiments described above, the hair tool 700 may be formed via a variety of methods known in the art such as, for example, injection molding or additive manufacturing.

Figure 7A:
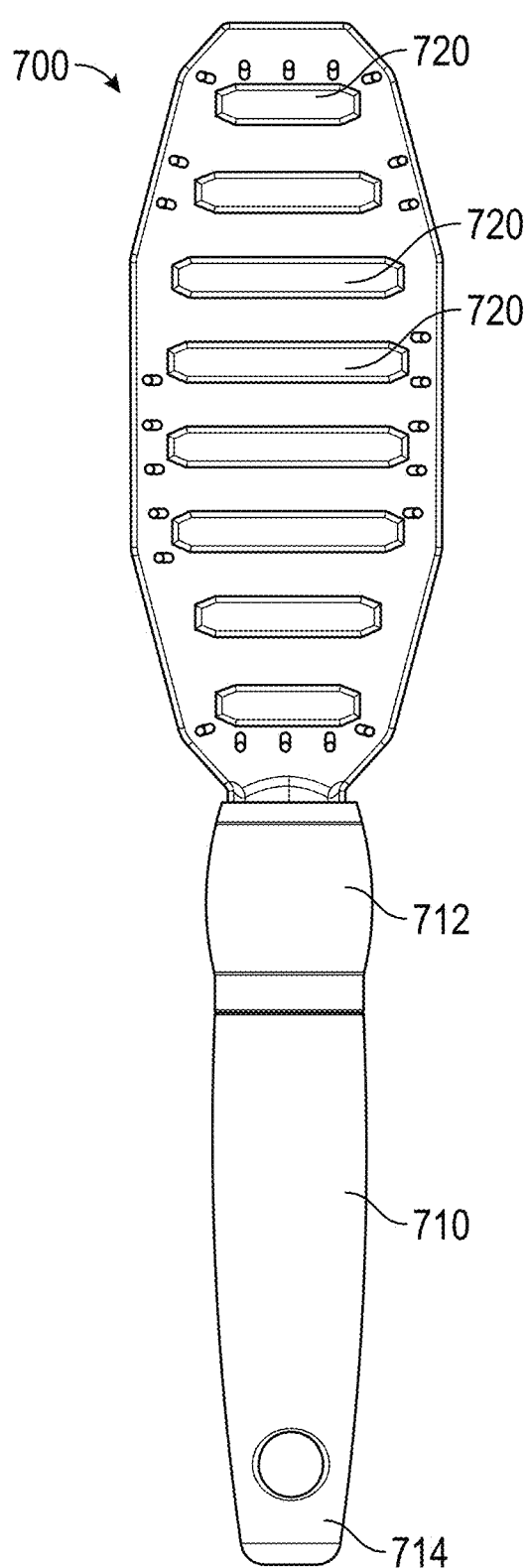
FIG. 7A is a first side view of a hair tool according to a seventh embodiment the present invention.
Figure 7B:
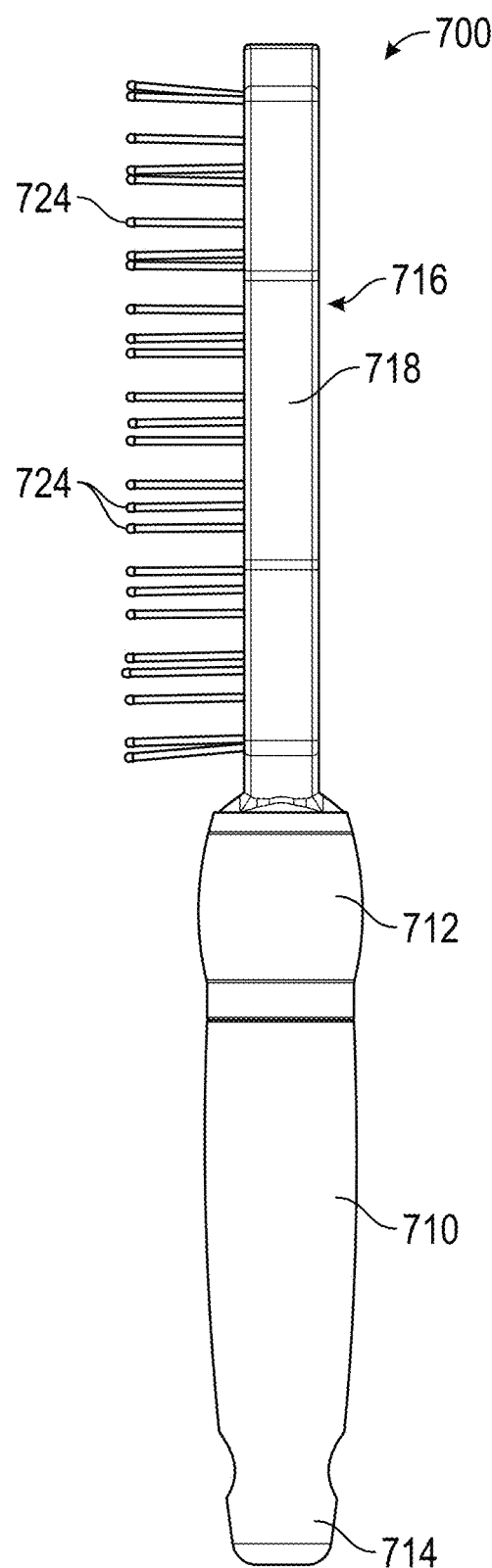
FIG. 7C is a third side view of the hair tool of FIG. 7A.
FIG. 7D is a front end view of the hair tool of FIG. 7A.
FIG. 7E is a rear end view of the hair tool of FIG. 7A.
FIG. 7F is a first perspective view of the hair tool of FIG. 7A.
FIG. 7G is a second perspective view of the hair tool of FIG. 7A.
Figure 7C:
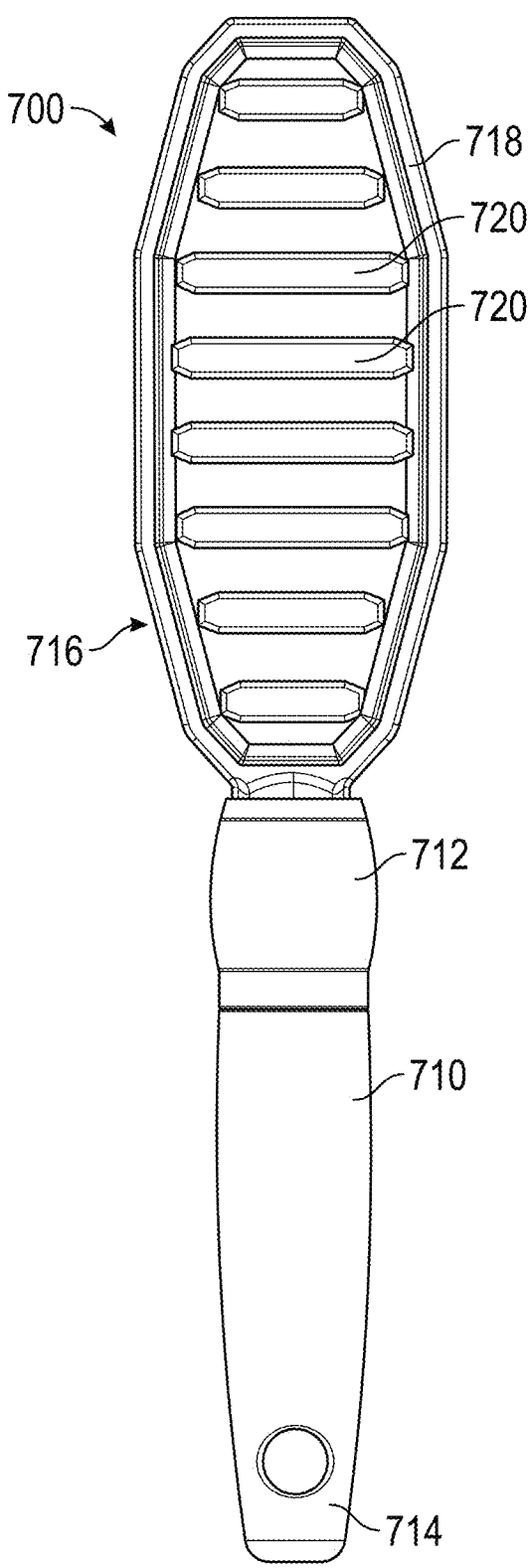
Figure 7D:
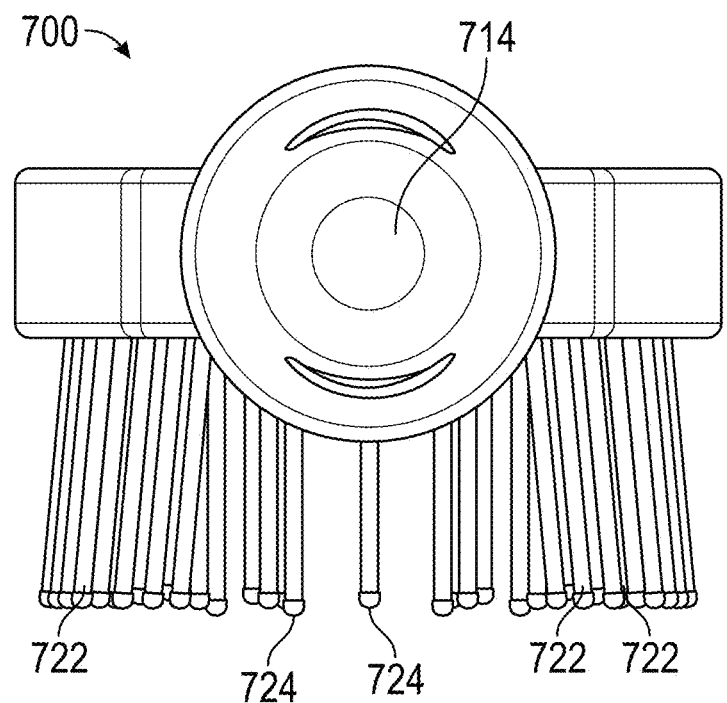
Figure 7E:
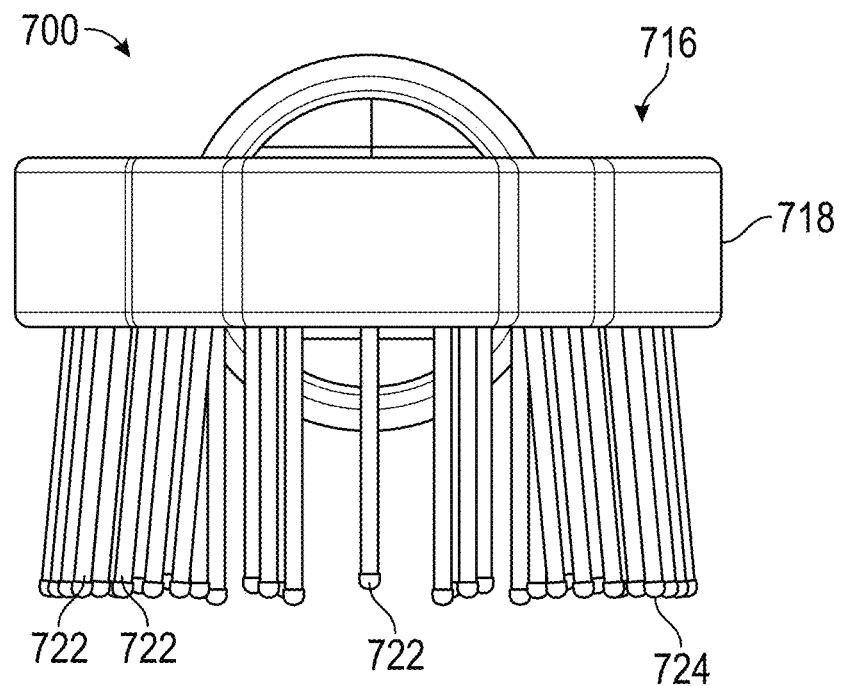
Figure 7F:
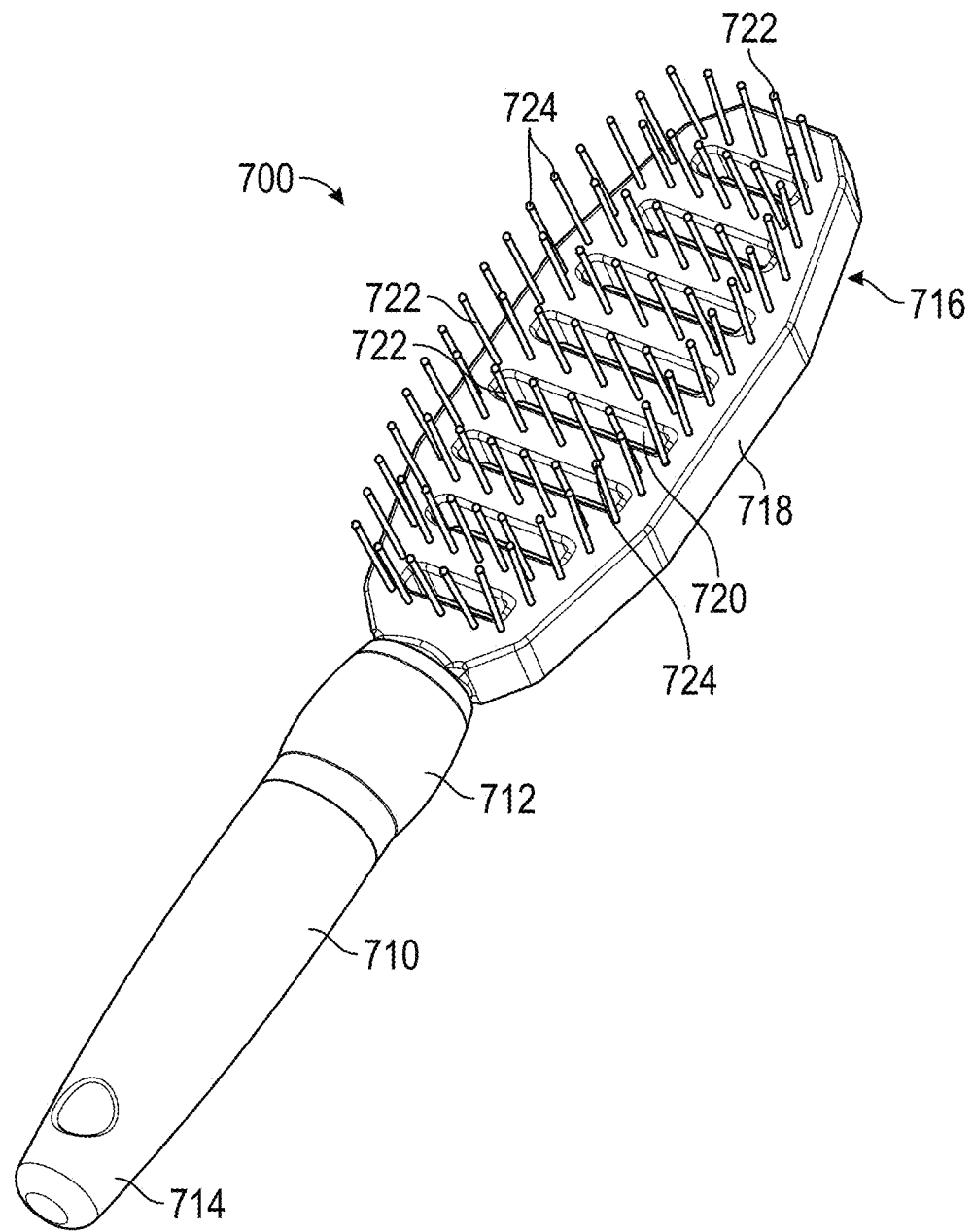
Figure 7G:
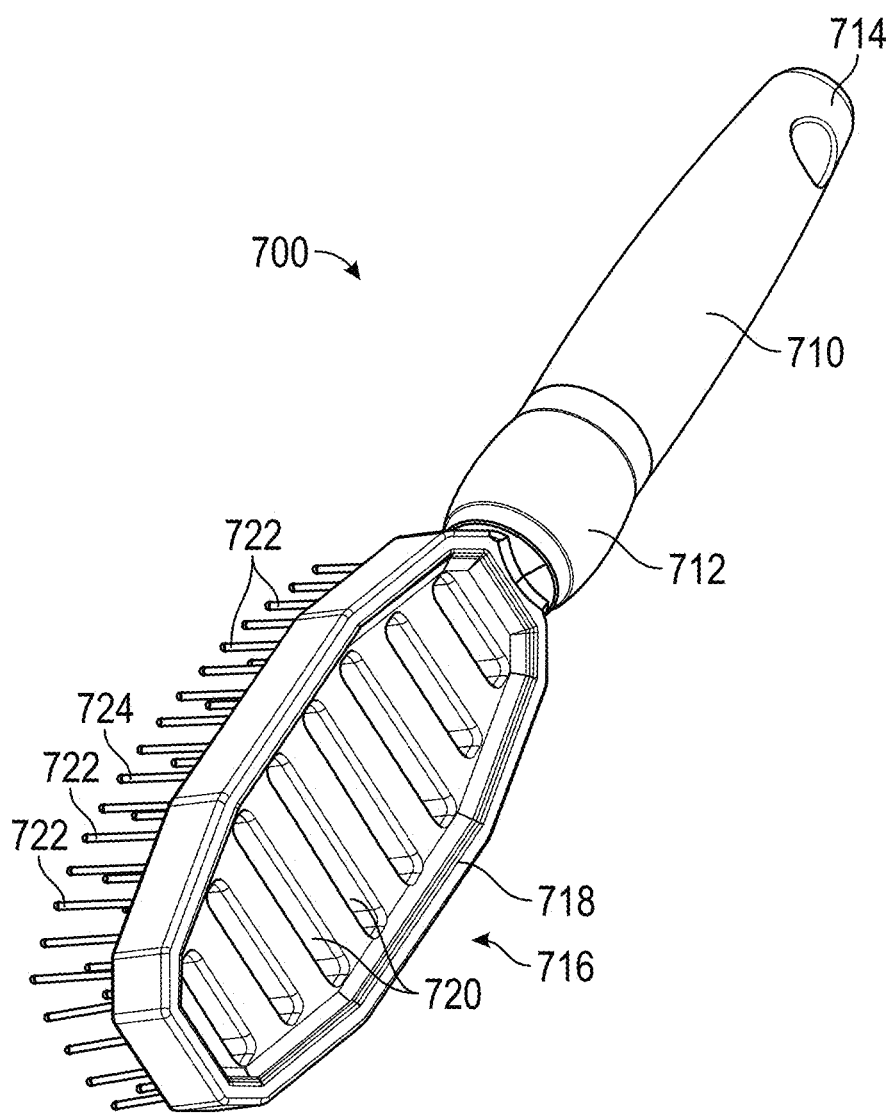

As best shown in FIGS. 7A and 7B, the head 716 includes a back plate 718 having a plurality of through openings 720 (vent openings) therethrough, and a plurality of bristles 722 mounted to the back plate 718 and extending therefrom. In an embodiment, the bristles 722 may be flexible or substantially stiff or rigid.

Similar to the embodiments described above, the bristles 422 may be manufactured with one or more therapeutic agent additives, such as CBD or hemp seed oil. Alternatively, the bristles 722 may be infused with, impregnated with, or saturated with such therapeutic agent after manufacture. In an embodiment, one or more of the bristles 722 may have ball-shaped or spherical distal tips 724 configured to retain the therapeutic agent (via an absorbent material, porous structure, etc.), or via an additive used during the manufacturing process. It is contemplated that the spherical tips 724 may be formed from any process known in the art, such as via dipping, molding or the like. As indicated above, each spherical tip 724 may be formed with, or treated with, a therapeutic agent such as CBD or hemp seed oil. For example, each tip 724 may be formed by dipping the distal ends of the bristles into a material containing a CBD or hemp seed oil additive. Alternatively, the ball-shaped tips may be generally hollow and include an aperture for releasing the therapeutic agent.

The present invention therefore provides hair tools in the nature of grooming combs or brushes, wherein the teeth, bristles or brush head includes or contains one or more additives in the nature of a therapeutic agent such as, for example, CBD or hemp seed oil. The additive may be added to the material prior to forming the material to shape to manufacture the hair tool, or can be added to the hair tool and/or teeth thereof in a post manufacture process (e.g., by infusing, saturating, impregnating, or otherwise treating the hair tool and/or bristles thereof with the therapeutic agent). The therapeutic agent is then distributed to a user's hair and/or scalp during use. Importantly, hemp-based plastics have biodegradable qualities, so that in addition to providing therapeutic benefits, the hair tool may be more environmentally friendly than existing products.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A hair tool, comprising:
a handle portion; and
a plurality of bristles operatively connected to the handle portion, at least one of the plurality of bristles having a ball-shaped distal tip, the ball-shaped distal tip containing at least one therapeutic agent additive;
wherein the at least one therapeutic agent additive includes CBD or hemp seed oil;
wherein the ball-shaped distal tip is formed from a plastic or polymeric material and contains an absorbent material configured to retain the at least one therapeutic agent additive;
wherein the at least one therapeutic agent additive is mixed with the plastic or polymeric material prior to forming the ball-shaped distal tip; and
wherein the therapeutic agent is contained only in the ball-shaped distal tip and not a remainder of the plurality of bristles.

2. The hair tool of claim 1, wherein:
the ball-shaped distal tip of the plurality of bristles are impregnated, infused or saturated with the at least one therapeutic agent additive.

3. The hair tool of claim 2, wherein:
the plurality of bristles are porous.

4. The hair tool of claim 1, further comprising:
a head portion connected to the handle portion;
wherein the bristles extend from the head portion; and
wherein the hair tool takes the form of a grooming brush.

5. The hair tool of claim 4, wherein:
the head portion includes a cushion;
wherein the bristles are connected to the cushion; and
wherein the cushion contains the at least one therapeutic agent additive.

6. The hair tool of claim 1, wherein:
the hair tool takes the form of a grooming comb.

7. The hair tool of claim 1, wherein:
the ball-shaped distal tip has a micro-porous structure configured to retain the at least one therapeutic agent additive when contacted therewith.

8. A method of manufacturing a hair tool, comprising the steps of:
via additive manufacturing, forming a handle of the hair tool from a first material; and
via additive manufacturing, forming a plurality of bristles of the hair tool from a second material, the second material containing a therapeutic agent additive not present in the first material;
wherein the plurality of bristles are operatively connected to the handle;
wherein the at least one therapeutic agent additive includes CBD or hemp seed oil;
wherein the bristles are formed with a ball-shaped distal tip, the ball-shaped distal tip including an absorbent material configured to retain the therapeutic agent additive.

9. The method according to claim 8, further comprising the step of:
changing from the first material to the second material as an inline part of the additive manufacturing process.

10. A method of manufacturing a hair tool, comprising the steps of:
via additive manufacturing, forming a handle portion and a plurality of bristles operatively connected to the handle; and
at least one of impregnating, infusing or saturating the plurality of bristles with at least one therapeutic agent additive;
wherein the at least one therapeutic agent additive is at least one of CBD or hemp seed oil;
wherein the bristles are formed with a ball-shaped distal tip via dipping or molding, the ball-shaped distal tip containing an absorbent material configured to retain the at least one therapeutic agent additive; and
wherein the at least one therapeutic agent additive is present only within the ball-shaped distal tip and is absent in a remainder of the plurality of bristles.

11. The method according to claim 10, wherein:
the ball-shaped distal tip is generally hollow and includes a hole; and
wherein the therapeutic agent additive is received within the ball-shaped tip and controllably released through the hole.

* * * * *